US012566461B2

(12) United States Patent　(10) Patent No.:　US 12,566,461 B2
Yoshikawa et al.　(45) Date of Patent:　Mar. 3, 2026

(54) CONTROL SYSTEM, CONTROL METHOD, AND NON-TRANSITORY STORAGE MEDIUM

(71) Applicant: TOYOTA JIDOSHA KABUSHIKI KAISHA, Toyota (JP)

(72) Inventors: Kei Yoshikawa, Nagoya (JP); Shiro Oda, Anjo (JP); Takeshi Matsui, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 100 days.

(21) Appl. No.: 18/611,088

(22) Filed: Mar. 20, 2024

(65) Prior Publication Data

US 2024/0353869 A1　Oct. 24, 2024

(30) Foreign Application Priority Data

Apr. 19, 2023　(JP) ................................. 2023-068269

(51) Int. Cl.
*G05D 1/86*　(2024.01)
*G05D 1/243*　(2024.01)
*G05D 1/247*　(2024.01)
*G05D 1/85*　(2024.01)
*G05D 109/10*　(2024.01)
*G05D 111/30*　(2024.01)

(52) U.S. Cl.
CPC ............... *G05D 1/86* (2024.01); *G05D 1/243* (2024.01); *G05D 1/247* (2024.01); *G05D 1/85* (2024.01); *G05D 2109/10* (2024.01); *G05D 2111/32* (2024.01)

(58) Field of Classification Search
CPC ........ G05D 1/86; G05D 1/028; G05D 1/0088; G05D 1/0011; G08B 13/19645; B60R 16/0232; B25J 13/006; G05B 19/4182; B60W 60/0053; B60W 60/00186; B60W 50/029; H04R 29/001; A47L 11/4011; G08G 1/146; B60Q 9/008; B65G 1/00
See application file for complete search history.

(56) References Cited

U.S. PATENT DOCUMENTS

| | | | | |
|---|---|---|---|---|
| 2006/0049940 A1* | 3/2006 | Matsuhira | ........ | G08B 13/19645 340/541 |
| 2008/0086236 A1* | 4/2008 | Saito | ...................... | G05D 1/028 901/1 |
| 2009/0189570 A1* | 7/2009 | Abe | .................... | B60R 16/0232 320/162 |

(Continued)

FOREIGN PATENT DOCUMENTS

| | | |
|---|---|---|
| JP | 2013-214143 A | 10/2013 |
| JP | 5920743 B2 | 5/2016 |

(Continued)

*Primary Examiner* — Yuri Kan
(74) *Attorney, Agent, or Firm* — Oliff PLC

(57) ABSTRACT

A control system configured to control a system including a mobile robot configured to move autonomously and a server configured to be connected to the mobile robot by wireless communication includes one or more processors configured to, when the mobile robot is unable to communicate with the server, determine a state of the mobile robot, including whether the mobile robot has an abnormality, based on information acquired by sensors around the mobile robot.

16 Claims, 13 Drawing Sheets

(56) References Cited

U.S. PATENT DOCUMENTS

| | | | | |
|---|---|---|---|---|
| 2015/0239436 | A1 | 8/2015 | Kanai et al. | |
| 2017/0285628 | A1* | 10/2017 | Erhart | B25J 13/006 |
| 2019/0164267 | A1 | 5/2019 | Oe et al. | |
| 2019/0302741 | A1* | 10/2019 | Naitou | G05B 19/4182 |
| 2020/0192357 | A1* | 6/2020 | Park | B60W 60/0053 |
| 2020/0324791 | A1* | 10/2020 | Ueno | G05D 1/0088 |
| 2021/0122362 | A1* | 4/2021 | Okamura | G05D 1/0011 |
| 2021/0347371 | A1* | 11/2021 | Lee | B60W 60/0053 |
| 2021/0392451 | A1* | 12/2021 | Lee | H04R 29/001 |
| 2022/0017107 | A1* | 1/2022 | Shinoda | B60W 60/00186 |
| 2022/0104675 | A1* | 4/2022 | Schneider | A47L 11/4011 |
| 2022/0212657 | A1* | 7/2022 | Sugano | G08G 1/146 |
| 2022/0339779 | A1 | 10/2022 | Oda et al. | |
| 2023/0182696 | A1* | 6/2023 | Yeom | B60Q 9/008 |
| | | | | 701/23 |

FOREIGN PATENT DOCUMENTS

| | | | | | |
|---|---|---|---|---|---|
| JP | 2019-101502 | A | | 6/2019 | |
| JP | 6755374 | B1 | | 9/2020 | |
| JP | 2022146697 | A | * | 10/2022 | B65G 1/00 |
| JP | 2022-166397 | A | | 11/2022 | |

* cited by examiner

FIG. 3
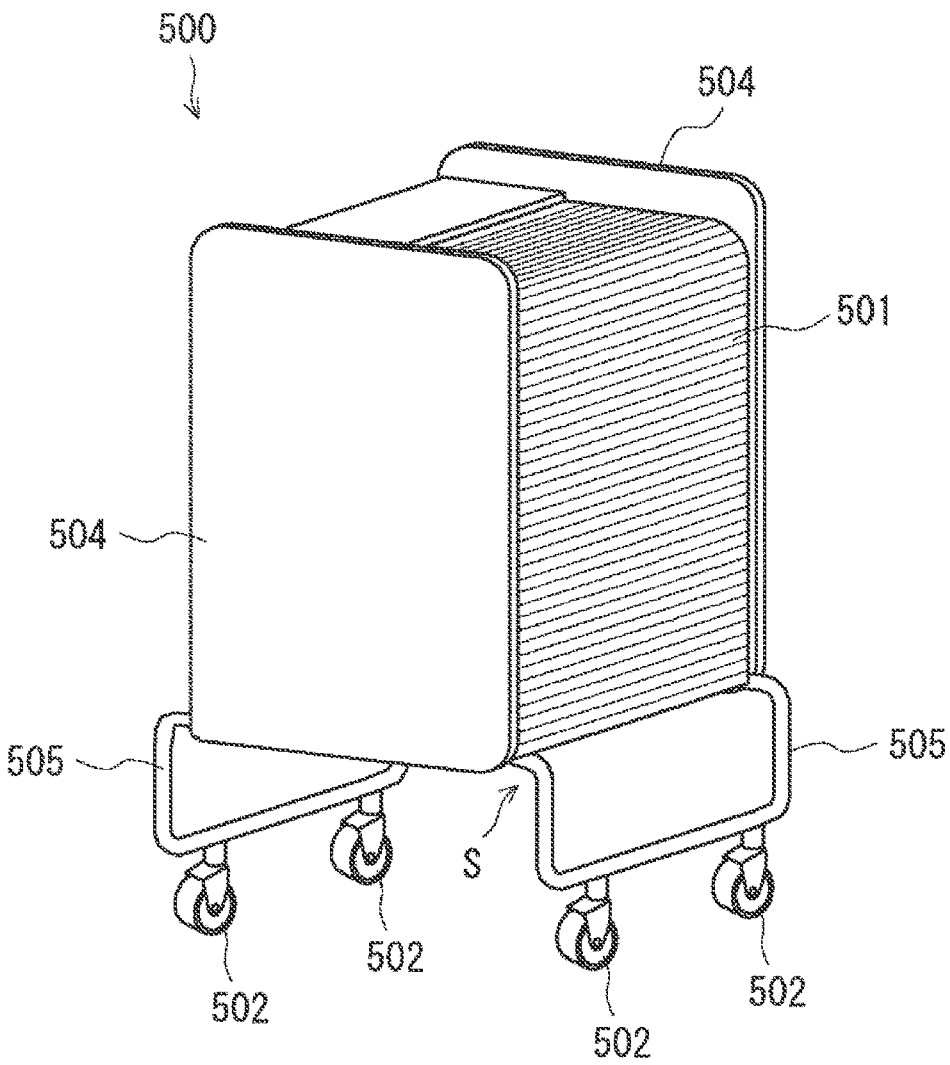
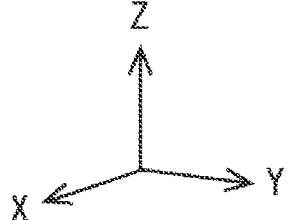

FIG. 5

| TRAVELING STATE OF MOBILE ROBOT | FIRST LIGHT-EMITTING UNIT | SECOND LIGHT-EMITTING UNIT |
|---|---|---|
| NO ABNORMALITY PRESENT | 110 140 11 | 131 120 12 |
| ABNORMALITY PRESENT | 110 140 11 | 131 120 12 |
| ABNORMALITY ELIMINATED | 110 140 11 | 131 120 12 |

FIG. 7

| TRAVELING STATE OF MOBILE ROBOT | FIRST LIGHT-EMITTING UNIT | | SECOND LIGHT-EMITTING UNIT | |
|---|---|---|---|---|
| | COLOR | TURN-ON PATTERN | COLOR | TURN-ON PATTERN |
| NO ABNORMALITY PRESENT | GREEN | ALWAYS ON | GREEN | ALWAYS ON |
| ABNORMALITY PRESENT | RED | FLASHING (SHORT INTERVALS) | GREEN | FLASHING (LONG INTERVALS) |
| ABNORMALITY ELIMINATED | BLUE | ALWAYS ON | BLUE | ALWAYS ON |

FIG. 8

| OPERATING STATE OF MOBILE ROBOT | | FIRST LIGHT-EMITTING UNIT | | SECOND LIGHT-EMITTING UNIT | |
|---|---|---|---|---|---|
| | | COLOR | TURN-ON PATTERN | COLOR | TURN-ON PATTERN |
| AUTONOMOUS MOVEMENT MODE (NORMAL) | TRAVELING AUTONOMOUSLY | GREEN | ALWAYS ON | GREEN | ALWAYS ON |
| | ON STANDBY | GREEN | BREATHING RHYTHM | GREEN | ALWAYS ON |
| | PROMPT OPERATION | BLUE | SEQUENTIAL LIGHTING | GREEN | ALWAYS ON |
| | ALERT | ORANGE | FLASHING (LONG INTERVALS) | GREEN | ALWAYS ON |
| USER OPERATION MODE (NORMAL) | | BLUE | SEQUENTIAL LIGHTING | ORANGE | ALWAYS ON |
| OPERATIONAL ABNORMALITY | | RED | FLASHING (SHORT INTERVALS) | RED | ALWAYS ON |

CONTROL SYSTEM, CONTROL METHOD, AND NON-TRANSITORY STORAGE MEDIUM

CROSS-REFERENCE TO RELATED APPLICATION

This application claims priority to Japanese Patent Application No. 2023-068269 filed on Apr. 19, 2023, incorporated herein by reference in its entirety.

BACKGROUND

1. Technical Field

The present disclosure relates to a control system, a control method, and a non-transitory storage medium.

2. Description of Related Art

Japanese Unexamined Patent Application Publication No. 2022-166397 (JP 2022-166397 A) discloses a control system for a mobile robot.

SUMMARY

In the control system described in JP 2022-166397 A, when the mobile robot falls into an abnormal state and is unable to communicate with a server that controls the mobile robot, the server cannot detect the state of the mobile robot, including whether the mobile robot has an abnormality.

The present disclosure provides a control system, a control method, and a non-transitory storage medium in which, when an autonomously movable mobile robot falls into an abnormal state and is unable to communicate with a server that controls the mobile robot, the server can detect the state of the mobile robot, including whether the mobile robot has an abnormality.

A control system according to a first aspect of the present disclosure is configured to control a system including a mobile robot configured to move autonomously and a server configured to be connected to the mobile robot by wireless communication. The control system includes one or more processors configured to, when the mobile robot is unable to communicate with the server, determine a state of the mobile robot, including whether the mobile robot has an abnormality, based on information acquired by sensors around the mobile robot. With such a configuration in the control system, when the mobile robot configured to move autonomously falls into an abnormal state and is unable to communicate with the server that controls the mobile robot, the server can detect the state of the mobile robot, including whether the mobile robot has an abnormality. In autonomous movement control, the mobile robot can be controlled to move autonomously using a learning model obtained through machine learning.

In the control system according to the first aspect of the present disclosure, the sensors around the mobile robot may include at least one of a sensor mounted on another mobile robot and a plurality of sensors installed inside a facility where the mobile robot moves. With such a configuration in the control system, the server can easily acquire information from the sensors.

In the control system according to the first aspect of the present disclosure, the sensors around the mobile robot may include a camera, and the information may include an image captured by the camera. With such a configuration in the control system, the server can acquire information using the camera inside the facility where the mobile robot is utilized.

In the control system according to the first aspect of the present disclosure, the mobile robot may be configured to, when the abnormality has occurred, control a display device mounted on the mobile robot to give a notification of a display pattern associated with the abnormality. With such a configuration in the control system, the display pattern in the notification is easily detected by the camera. Therefore, the server can easily acquire information associated with the abnormality.

In the control system according to the first aspect of the present disclosure, the mobile robot may be configured to, when the abnormality has occurred, move in a movement pattern associated with the abnormality. With such a configuration in the control system, the movement pattern is easily detected by the camera. Therefore, the server can easily acquire information associated with the abnormality.

In the control system according to the first aspect of the present disclosure, the sensors around the mobile robot may include a microphone, and the information may include sound acquired by the microphone. With such a configuration in the control system, the sensor can have a simple configuration. With the simple configuration, the server can acquire information associated with the abnormality.

In the control system according to the first aspect of the present disclosure, the mobile robot may be configured to, when the abnormality has occurred, control a sound output device mounted on the mobile robot to output sound in a pattern associated with the abnormality. With such a configuration in the control system, the server can easily acquire information associated with the abnormality by simply outputting sound from the mobile robot.

In the control system according to the first aspect of the present disclosure, the one or more processors may be configured to perform a position estimation process for estimating a current position of the mobile robot based on a position of a sensor from which the information is acquired. With such a configuration in the control system, the server can easily grasp the current position of the abnormal mobile robot.

In the control system according to the first aspect of the present disclosure, the one or more processors may be configured to notify external terminal equipment about the current position estimated in the position estimation process. With such a configuration in the control system, a user carrying the external terminal equipment that has received the notification can deal with the abnormality of the mobile robot.

In the control system according to the first aspect of the present disclosure, the mobile robot may be configured to stop traveling when the abnormality has occurred. With such a configuration in the control system, the safety can be improved when the mobile robot has the abnormality.

In the control system according to the first aspect of the present disclosure, the mobile robot may be configured to move to a predetermined safety zone when the abnormality has occurred. With such a configuration in the control system, the safety can be improved when the mobile robot has the abnormality.

In the control system according to the first aspect of the present disclosure, the abnormality may include an abnormality other than inability in communication between the mobile robot and the server. With such a configuration in the control system, even when an abnormality other than the communication abnormality has occurred in the mobile robot, the server can detect the state of the mobile robot, including whether the mobile robot has an abnormality.

A control method according to a second aspect of the present disclosure is a method for controlling a system including a mobile robot configured to move autonomously and a server configured to be connected to the mobile robot by wireless communication. The control method includes determining, when the mobile robot is unable to communicate with the server, a state of the mobile robot, including whether the mobile robot has an abnormality, based on information acquired by sensors around the mobile robot. With such a configuration in the control method, when the mobile robot configured to move autonomously falls into an abnormal state and is unable to communicate with the server that controls the mobile robot, the server can detect the state of the mobile robot, including whether the mobile robot has an abnormality.

In the control method according to the second aspect of the present disclosure, the sensors around the mobile robot may include at least one of a sensor mounted on another mobile robot and a plurality of sensors installed inside a facility where the mobile robot moves. With such a configuration in the control method, the server can easily acquire information from the sensors.

In the control method according to the second aspect of the present disclosure, the sensors around the mobile robot may include a camera, and the information may include an image captured by the camera. With such a configuration in the control method, the server can acquire information using the camera inside the facility where the mobile robot is utilized.

In the control method according to the second aspect of the present disclosure, the mobile robot may be configured to, when the abnormality has occurred, control a display device mounted on the mobile robot to give a notification of a display pattern associated with the abnormality. With such a configuration in the control method, the display pattern in the notification is easily detected by the camera. Therefore, the server can easily acquire information associated with the abnormality.

In the control method according to the second aspect of the present disclosure, the mobile robot may be configured to, when the abnormality has occurred, move in a movement pattern associated with the abnormality. With such a configuration in the control method, the movement pattern is easily detected by the camera. Therefore, the server can easily acquire information associated with the abnormality.

In the control method according to the second aspect of the present disclosure, the sensors around the mobile robot may include a microphone, and the information may include sound acquired by the microphone. With such a configuration in the control method, the sensor can have a simple configuration. With the simple configuration, the server can acquire information associated with the abnormality.

In the control method according to the second aspect of the present disclosure, the mobile robot may be configured to, when the abnormality has occurred, control a sound output device mounted on the mobile robot to output sound in a pattern associated with the abnormality. With such a configuration in the control method, the server can easily acquire information associated with the abnormality by simply outputting sound from the mobile robot.

A non-transitory storage medium according to a third aspect of the present disclosure stores instructions that cause a computer to perform a process. The computer is included in a server configured to be connected, by wireless communication, to a mobile robot configured to move autonomously. The process includes determining, when the mobile robot is unable to communicate with the server, a state of the mobile robot, including whether the mobile robot has an abnormality, based on information acquired by sensors around the mobile robot. With such a configuration in the non-transitory storage medium, when the mobile robot configured to move autonomously falls into an abnormal state and is unable to communicate with the server that controls the mobile robot, the server can detect the state of the mobile robot, including whether the mobile robot has an abnormality.

According to the present disclosure, it is possible to provide the control system, the control method, and the non-transitory storage medium in which, when the autonomously movable mobile robot falls into an abnormal state and is unable to communicate with the server that controls the mobile robot, the server can detect the state of the mobile robot, including whether the mobile robot has an abnormality.

BRIEF DESCRIPTION OF THE DRAWINGS

Features, advantages, and technical and industrial significance of exemplary embodiments of the invention will be described below with reference to the accompanying drawings, in which like signs denote like elements, and wherein:

FIG. 3 is a perspective view showing an example of the overall configuration of a wagon to be transported by the mobile robot in the transport system of FIG. 1;

FIG. 5 shows an example of light emission patterns that can be implemented by the mobile robot of FIG. 2;

FIG. 7 shows another example of the light emission patterns that can be implemented by the mobile robot of FIG. 2;

FIG. 8 shows another example of the light emission patterns that can be implemented by the mobile robot of FIG. 2;

DETAILED DESCRIPTION OF EMBODIMENTS

Hereinafter, the present invention will be described based on an embodiment of the invention. However, the invention according to the claims is not limited to the following embodiment. All the configurations described in the embodiment are not necessarily essential as means for solving the problem.

Embodiment

A control system according to the present embodiment controls a system including an autonomously movable mobile robot and a server connectable to the mobile robot by wireless communication. The term "control system" can refer to either the mobile robot and the server or components of control systems in the mobile robot and the server, or can refer to either the server or the components of the control system in the server.

This mobile robot can be configured to transport an object to be transported (hereinafter also referred to as "transport object"). Although such an example will be given below, the mobile robot need not be configured to transport a transport object. In the case where the mobile robot is configured to transport a transport object, the mobile robot can also be referred to as "transport robot", and the system including the mobile robot can also be referred to as "transport system". The server provides information etc. for autonomous movement to the mobile robot. It can be said that the server manages the mobile robot. Therefore, the server will be referred to as "host management device" in the following description.

Transport System

Figure 1:
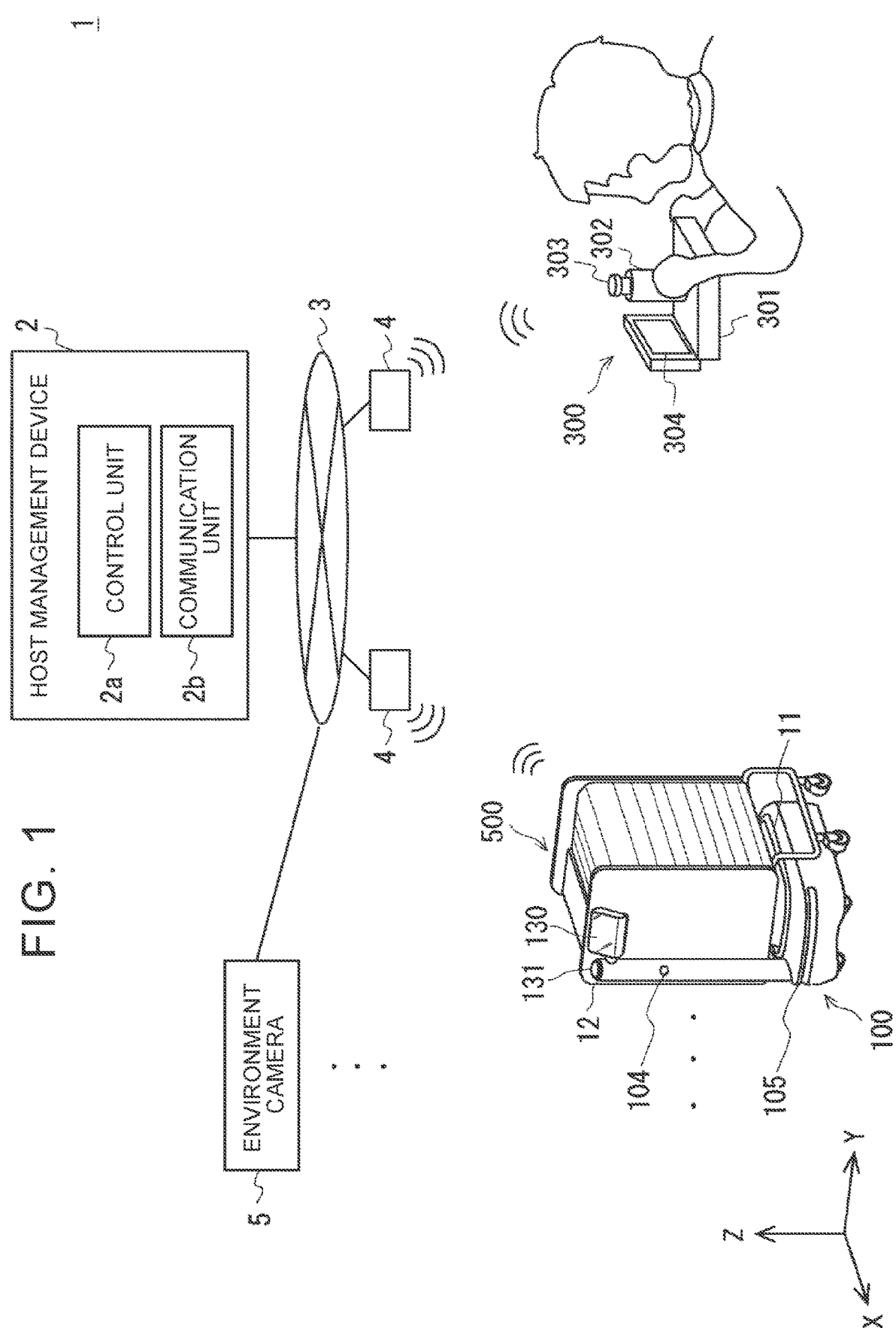
FIG. 1 is a schematic diagram showing an example of the overall configuration of a transport system according to an embodiment.

Hereinafter, an example of the configuration of the transport system will be described with reference to FIG. 1. FIG. 1 is a schematic diagram showing an example of the overall configuration of the transport system according to the present embodiment.

As shown in FIG. 1, a transport system 1 can include an autonomously movable mobile robot 100, a host management device 2, a network 3, a communication unit 4, an environment camera 5, and user equipment 300. The transport system 1 is a system for transporting a transport object by the mobile robot 100, and includes a control system according to this configuration example.

In the following description, an XYZ orthogonal coordinate system will be used as appropriate. An X direction is a front-rear direction of the mobile robot 100 in FIG. 1, a Y direction is a right-left direction of the mobile robot 100 in FIG. 1, and a Z direction is a vertical up-down direction. More specifically, a +X direction is defined as a forward direction of the mobile robot 100, and a −X direction is defined as a rearward direction of the mobile robot 100. A +Y direction is a leftward direction of the mobile robot 100, and a −Y direction is a rightward direction of the mobile robot 100. A +Z direction is a vertically upward direction, and a −Z direction is a vertically downward direction.

The mobile robot 100 and the user equipment 300 are connected to the host management device 2 via the communication unit 4 and the network 3. The network 3 is a wired or wireless local area network (LAN) or wide area network (WAN). The host management device 2 and the environment camera 5 are connected to the network 3 by wire or wireless. As can be seen from this configuration, each of the mobile robot 100, the host management device 2, and the environment camera 5 includes a communication unit. The communication unit 4 is, for example, a wireless LAN unit installed in each environment. The communication unit 4 may be a general-purpose communication device such as a WiFi (registered trademark) router.

The host management device 2 is a device that is connectable to the mobile robot 100 by wireless communication, and is a management system that manages a plurality of mobile robots 100. The host management device 2 can include a control unit 2a for controlling the mobile robots 100, and a communication unit 2b for performing wireless communication. The control unit 2a can be implemented by, for example, integrated circuitry, and can be implemented by, for example, a processor such as a micro processor unit (MPU) or a central processing unit (CPU), a working memory, and a nonvolatile storage device. Control programs to be executed by the processor are stored in the storage device, and the processor can perform the function of the control unit 2a in cooperation with the communication unit 2b by loading the control programs into the working memory and executing them. The control unit 2a can be referred to as "computer" or "control computer".

The transport system 1 can efficiently control the mobile robots 100 while autonomously moving the mobile robots 100 in an autonomous movement mode inside a predetermined facility or while moving the mobile robots 100 in a user operation mode according to user operations inside the predetermined facility. The "facility" can refer to various types of facility including medical and welfare facilities such as hospitals, rehabilitation facilities, nursing homes, and residential care homes for the elderly, commercial facilities such as hotels, restaurants, office buildings, event venues, and shopping malls, and other complex facilities. The user may be a worker etc. at a facility where the mobile robot 100 is utilized, and may be a hospital staff including a hospital worker when the facility is a hospital.

In order to perform such efficient control, a plurality of environment cameras 5 can be installed inside the facility. For example, the environment cameras 5 can be installed in a passage, a hallway, an elevator, an entrance, an exit, etc. inside the facility. The environment cameras 5 can be used not only for monitoring or both monitoring and controlling the mobile robots 100, but also for monitoring people.

Each environment camera 5 acquires an image of the range in which a person or the mobile robot 100 moves, and outputs image data representing the image. This image data may be still image data or moving image data. In the case where the image data is still image data, the still image data is obtained at each imaging interval. In the transport system 1, the host management device 2 collects the images acquired by the environment cameras 5 and information based on these images. As for the images that are used to control the mobile robots 100, the images etc. acquired by the environment cameras 5 may be directly sent to the mobile robots 100, and in the user operation mode, may be sent to the user equipment 300 either directly or via the host management device 2. The environment cameras 5 can be installed as surveillance cameras in passages inside the facility or at entrances to the facility.

The environment camera 5 is a camera installed inside the facility. Although one environment camera 5 suffices as long as it is installed at an appropriate location, a plurality of environment cameras 5 facilitates control on the mobile robots 100, and the host management device 2 can easily make abnormality determination described later that is a feature of the present embodiment. The following description will be made on the assumption that a plurality of environment cameras 5 is installed inside a facility where the mobile robots 100 are utilized. The phrase "inside the facility" may refer to not only indoors but also the premises of the facility.

The host management device 2 can determine, for each transport request, the mobile robot 100 to perform the transport task, and can send to the determined mobile robot 100 an operation command to perform the transport task. The mobile robot 100 can autonomously move from a transport origin to a transport destination according to the operation command. In this case, a transport route etc. may be determined by any method.

For example, the host management device 2 assigns the transport task to the mobile robot 100 located at or near the transport origin. Alternatively, the host management device 2 assigns the transport task to the mobile robot 100 heading toward or near the transport origin. The mobile robot 100 to which the transport task has been assigned moves to the transport origin to pick up a transport object.

Although a detailed example of the mobile robot 100 will be described later, the mobile robot 100 is an autonomous mobile robot and can transport, for example, a wagon 500. As mentioned about the user operation mode, the mobile robot 100 can have a function to move according to user's operations. That is, the mobile robot 100 can be a mobile robot configured to switch between the autonomous movement mode and the user operation mode. By the autonomous movement control, the mobile robot 100 can be controlled to move autonomously based on a route determined according to a set transport destination or a set route. In the autonomous movement control, the mobile robot 100 can also be controlled to move autonomously by determining a route, performing contact avoidance, etc. using a learning model obtained through machine learning.

The user operation mode in which the mobile robot 100 moves based on user operations may be any mode as long as the degree of involvement of the user operations is relatively high compared to the autonomous movement mode in which the mobile robot 100 moves autonomously. In other words, the user operation mode need not be limited to a mode in which the user controls all movements of the mobile robot with no autonomous control by the mobile robot. Similarly, the autonomous movement mode need not be limited to a mode in which the mobile robot performs fully autonomous control and does not accept any user operations. For example, the user operation mode and the autonomous movement mode may include the following first to third examples.

In the first example, the autonomous movement mode is a mode in which the mobile robot travels autonomously and determines when to stop and when to start traveling and the user does not perform any operations, and the user operation mode is a mode in which the mobile robot travels autonomously and the user operates to stop the mobile robot and to control the mobile robot to start traveling. In the second example, the autonomous movement mode is a mode in which the mobile robot travels autonomously and the user operates to stop the mobile robot and to control the mobile robot to start traveling, and the user operation mode is a mode in which the mobile robot does not travel autonomously and the user not only operates to stop the mobile robot and to control the mobile robot to start traveling but also operates to control the mobile robot to travel. In the third example, the autonomous movement mode is a mode in which the mobile robot travels autonomously and determines when to stop and when to start traveling and the user does not perform any operations, and the user operation mode is a mode in which the mobile robot travels autonomously for speed adjustment, contact avoidance, etc. and the user operates to change the direction of travel and the route etc.

The user equipment 300 is a device that remotely operates the mobile robot 100 via the host management device 2 or directly in the user operation mode. The user equipment 300 can have a communication function for this remote operation, and can include a display unit 304. Various types of terminal equipment such as a tablet computer and a smartphone can be used as the user equipment 300. The user equipment 300 can also receive a switch operation to switch between the user operation mode and the autonomous movement mode. When this switch operation is performed, the mode of the mobile robot 100 can be switched via the host management device 2.

An example will be given below in which the user equipment 300 includes a joystick device. The user equipment 300 can include a stick portion 302 and a button 303 as part of the joystick device in addition to a body 301. The joystick device is a device that is operated to move the mobile robot 100 in a direction intended by the user in the user operation mode. The joystick device can receive a directional operation when the stick portion 302 is tilted in a direction in which the user wants the mobile robot 100 to move. The joystick device can also be controlled to perform a switch operation to switch between the autonomous movement mode and the user operation mode by depressing the button 303. Alternatively, the joystick device may be controlled to perform a select operation by depressing the button 303. The button 303 may be configured to serve as an emergency stop button when it is depressed for a predetermined period. In the case where the button 303 is configured to receive two or more of the switch operation, the select operation, and the emergency stop operation, that is, in the case where a plurality of operations is assigned to the button 303, predetermined periods associated with the operations only need to be set for the button 303. In the case where the user equipment 300 includes a joystick device, the user can perform similar operations even when the mobile robot 100 does not include a joystick device. It is assumed that, in the configuration in which the transport system 1 manages a plurality of mobile robots 100, the mobile robot 100 to be remotely operated can be selected by the user equipment 300 in the user operation mode.

The display unit 304 can display an image indicated by image data received from a camera 104 of the mobile robot 100 and an image indicated by image data received from the environment camera 5 located around the mobile robot 100. This allows the user to operate the mobile robot 100 using the stick portion 302 and the button 303.

The user equipment 300 can function as a device for sending a transport request etc. to the host management device 2. This transport request can include information indicating a transport object, and can also include information indicating a transport destination.

Mobile Robot

Figure 2:
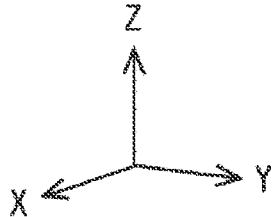
FIG. 2 is a perspective view showing an example of the overall configuration of a mobile robot in the transport system of FIG. 1.

Next, an example of the configuration of the mobile robot 100 will be described with reference to FIG. 2. FIG. 2 is a perspective view showing an example of the overall configuration of the mobile robot 100 in the transport system 1 of FIG. 1.

As shown in FIGS. 1 and 2, the mobile robot 100 can include a platform 110 on which a transport object is to be loaded, a stand 120, and an operation unit 130. The platform 110 is equipped with wheels 111, axles, a battery, a control computer 101, a drive motor, etc. It is assumed that the control computer 101 is mounted at the illustrated position in the platform 110. However, the control computer 101 need not necessarily be mounted at this position. The control computer 101 may be mounted at any other position in the platform 110, or part of the control computer 101 or the entire control computer 101 may be mounted in either or both of the stand 120 and the operation unit 130.

The platform 110 rotatably holds the wheels 111. In the example of FIG. 2, the platform 110 is provided with four wheels 111. The four wheels 111 are right and left front wheels, and right and left rear wheels. The mobile robot 100 moves along a desired route by independently controlling the rotational directions and the rotational speeds of the wheels 111. Part of the four wheels 111 may be drive wheels, and the rest of the wheels 111 may be driven wheels. As shown in FIG. 2, an additional driven wheel(s) may be provided between, for example, the front and rear wheels 111. The mobile robot 100 is movable in both the forward and rearward directions. That is, the mobile robot 100 moves in the forward direction when its wheels are rotated forward, and moves in the rearward direction when the wheels are rotated in reverse. Changing the rotational speed between the right and left wheels allows the mobile robot 100 to turn right or left.

In order to prevent contact with an obstacle, check the route, etc., various sensors such as a camera and a distance sensor may be mounted on at least one of the following components: the platform 110, the operation unit 130, and the stand 120.

FIGS. 1 and 2 show an example in which the camera 104 and a sensor 105 are provided as such sensors. The camera 104 is mounted facing the +X side on the stand 120, and the sensor 105 is mounted on the front side of the platform 110. A bumper may be installed on the front side of the platform 110, and the sensor 105 may be mounted on the bumper. The sensor 105 detects that an object comes into contact with the bumper. The mobile robot 100 can be controlled to stop when the sensor 105 detects contact with an object, that is, contact with an obstacle. Therefore, the sensor 105 can be referred to as "stop sensor". The sensor 105 need not necessarily be mounted on the front side. The sensor 105 may be a sensor that detects contact of an object with a bumper installed on part or all of the outer periphery of the mobile robot 100. The sensor 105 may be configured to also detect the contact position of the object on the installed bumper.

The control computer 101 can be implemented by, for example, integrated circuitry, and can be implemented by, for example, a processor such as an MPU or a CPU, a working memory, and a nonvolatile storage device. Control programs to be executed by the processor are stored in the storage device, and the processor can perform the function to control the mobile robot 100 by loading the control programs into the working memory and executing them. The control computer 101 can be referred to as "control unit".

The control computer 101 controls the mobile robot 100 to move autonomously toward a preset transport destination or along a preset transport route, based on prestored map data and information acquired by the various sensors exemplified by the camera 104. The control computer 101 can set the transport route and the transport destination by receiving them from the host management device 2. The control computer 101 can control a drive unit including the wheels 111 in order to autonomously move the mobile robot 100 along the transport route. The control computer 101 can also perform the autonomous movement control according to a movement control signal transmitted from the host management device 2. This autonomous movement control can include control for loading the wagon 500 shown in FIG. 3 and control for unloading the wagon 500. The wagon 500 will be described later. It can be said that the control computer 101 can include a movement control unit that performs such autonomous movement control.

In order to load and unload a transport object such as the wagon 500, the platform 110 can include a lifting mechanism 140 for loading and unloading a transport object. Part of the lifting mechanism 140 can be housed inside of the platform 110. The lifting mechanism 140 can be installed with its loading surface, namely its surface on which a transport object is to be loaded, being exposed on the upper surface of the platform 110. The lifting mechanism 140 is a lifting stage configured to be raised and lowered, and can be raised and lowered as controlled by the control computer 101. The platform 110 is provided with a motor and a guide mechanism for the raising and lowering of the lifting mechanism 140. An upper surface of the lifting mechanism 140 serves as the loading surface on which the wagon 500 as a transport object is to be loaded.

The wagon 500 is not limited to the configuration shown in FIG. 3, and may be any predetermined wagon of a size, shape, and weight that is loadable and transportable on the lifting mechanism 140. The lifting mechanism 140 includes a lift mechanism for lifting the wagon 500. Space above the lifting mechanism 140 serves as a loading space for loading a transport object. As far as the user loads the wagon 500, the platform 110 need not include the lifting mechanism 140.

The platform 110 can include a first light-emitting unit 11 at a position around the lifting mechanism 140. The first light-emitting unit 11 may have any configuration as long as it can emit light. The first light-emitting unit 11 can be composed of, for example, one or more light-emitting diodes (LEDs) or organic electroluminescence, and its light emission can be controlled by the control computer 101. The position, shape, and size of the first light-emitting unit 11 are not limited to those illustrated in the drawings. The mobile robot 100 can include the first light-emitting unit 11 even when the mobile robot 100 does not include the lifting mechanism 140. The terms "first" and "second" are used for the first light-emitting unit 11 and a second light-emitting unit 12 described later merely in order to distinguish therebetween.

The stand 120 is attached to the platform 110. The stand 120 is a rod-shaped member extending upward from the platform 110. In this example, the stand 120 is in a columnar shape that is long in the Z direction. However, the stand 120 may be in any shape, and the mobile robot 100 need not include the stand 120. The longitudinal direction of the stand 120 is parallel to the Z direction. The stand 120 is installed outside the lifting mechanism 140. That is, the stand 120 is installed so as not to interfere with the rising and lowering movements of the lifting mechanism 140. The stand 120 is installed on one end side of the platform 110 in the Y direction (right-left direction). The stand 120 is attached near the right front corner of the platform 110. The stand 120 is installed at the end of the platform 110 that is located on the +X side and −Y side on an XY plane.

The stand 120 may be provided with, for example, a stick portion 131 of a joystick device or an emergency stop button for stopping the mobile robot 100 in case of emergency, on its upper surface portion. The joystick device is a device that is operated to move the mobile robot 100 in a direction intended by the user in the user operation mode. Since the user can grip the stick portion 131 with his or her hand, the stick portion 131 can be referred to as "grip portion". The joystick device can receive a directional operation when the stick portion 131 is tilted in a direction in which the user wants the mobile robot 100 to move. The joystick device can also be controlled to perform a switch operation to switch between the autonomous movement mode and the user operation mode by depressing the stick portion 131. Alternatively, the joystick device can also be controlled to perform a select operation by depressing the stick portion 131. The stick portion 131 may serve as an emergency stop button when it is depressed for a predetermined period. When the stick portion 131 is configured to receive two or more of the switch operation, the select operation, and the emergency stop operation, this predetermined period only needs to be varied between or among such operations.

In the case where the user equipment 300 includes a joystick device, the user can perform similar operations even when the mobile robot 100 does not include a joystick device. The mobile robot 100 may include a button similar to the button 303 on the upper surface of the stick portion 131 etc. It is assumed that, in the configuration in which the transport system 1 manages a plurality of mobile robots 100, the mobile robot 100 to be remotely operated can be selected by the user equipment 300 in the user operation mode.

The stand 120 can include the second light-emitting unit 12 at a position around the stick portion 131. The second light-emitting unit 12 may have any configuration as long as it can emit light. The second light-emitting unit 12 may be composed of, for example, one or more LEDs or organic electroluminescence, and its light emission can be controlled by the control computer 101. The position, shape, and size of the second light-emitting unit 12 are not limited to those illustrated in the drawings. The mobile robot 100 may include the second light-emitting unit 12 even when the mobile robot 100 does not include the stand 120 or even when the mobile robot 100 includes the stand 120 but does not include the stick portion 131.

The stand 120 supports the operation unit 130. The operation unit 130 is attached near the upper end of the stand 120. Thus, the operation unit 130 can be installed at a height at which the operation unit 130 is easily operable by the user. That is, the stand 120 extends to a height at which the standing user can perform operations easily, and the stick portion 131 is also disposed at a height at which the stick portion 131 is easily operable by the user. The operation unit 130 extends to the +Y side from the stand 120. From the standpoint of case of operation, the operation unit 130 can be mounted in the middle in the right-left direction of the platform 110.

The operation unit 130 can include a touch panel monitor etc. that receives user operations. The operation unit 130 may include a microphone etc. for audio input. The monitor of the operation unit 130 faces the opposite side from the platform 110. That is, a display surface (operation surface) of the operation unit 130 is a surface on the +X side. The operation unit 130 may be detachable from the stand 120. That is, a holder that holds the touch panel may be attached to the stand 120. The user can enter a transport destination of a transport object, transport information about the transport object, etc. by operating the operation unit 130. The operation unit 130 can display, to the user, information such as details of a transport object being transported or a transport object to be transported and a destination of the transport object. The mobile robot 100 need not include the operation unit 130. Even in that case, the mobile robot 100 may be operable in the user operation mode. For example, the mobile robot 100 may be equipped with a device that is operated in the user operation mode, such as the joystick device, or may be connected to an operation device for remote operations.

As illustrated in the drawings, the operation unit 130 and the stick portion 131 can be mounted at least at about the same height so that they can be operated intuitively. Thus, the user can intuitively operate the operation unit 130 and the stick portion 131 even when an operation to depress the stick portion 131 is assigned to an operation to select details of an operation displayed on the operation unit 130.

An integrated circuit (IC) card reader for the user to get authenticated using an IC card etc. may be installed on the stand 120 at about the same height position as that of the operation unit 130 or inside the operation unit 130. Although the mobile robot 100 need not necessarily have a user authentication function, the mobile robot 100 with the user authentication function can block mischievous operations by a third party etc. The user authentication function is not limited to the type using an IC card, and may be of the type using user information and password that are entered via the operation unit 130. However, the user authentication function of the type using various short-range wireless communication technologies that allow contactless authentication can save the user a hassle and can prevent infection.

The user can place a transport object in the wagon 500 loaded on the mobile robot 100 and request the mobile robot 100 to transport the transport object. The wagon 500 itself can also be referred to as "transport object". Therefore, for convenience, a transport object that is placed in the wagon 500 will be hereinafter referred to as "article" in order to distinguish between them. The mobile robot 100 transports the wagon 500 by autonomously moving to a set destination. That is, the mobile robot 100 performs the task of transporting the wagon 500. In the following description, a location where the wagon 500 is loaded will be referred to as "transport origin" or "loading location", and a location to which the wagon 500 is delivered will be referred to as "transport destination" or "destination".

For example, it is assumed that the mobile robot 100 moves around a general hospital with a plurality of clinical departments. The mobile robot 100 transports an article such as supplies, consumables, and medical equipment between the clinical departments. For example, the mobile robot 100 delivers an article from a nurses' station of one clinical department to a nurses' station of another clinical department. Alternatively, the mobile robot 100 delivers an article from a storage for supplies and medical equipment to a nurses' station of a clinical department. The mobile robot 100 also delivers medicine dispensed in a dispensing department to a clinical department or patient expected to use the medicine.

Examples of the article include medicines, consumables such as bandages, specimens, test equipment, medical equipment, hospital foods, and supplies such as stationery. Examples of the medical equipment include sphygmomanometers, blood transfusion pumps, syringe pumps, foot pumps, nurse call buttons, bed leaving sensors, low-pressure continuous suction devices, electrocardiogram monitors, infusion controllers, enteral feeding pumps, ventilators, cuff pressure gauges, touch sensors, inhalers, nebulizers, pulse oximeters, artificial resuscitators, aseptic isolators, and ultrasound diagnostic equipment. The mobile robot 100 may transport meals such as hospital foods and foods for a special diet a patient follows to prepare for a test. The mobile robot 100 may transport used equipment, used tableware, etc. When the transport destination is on a different floor, the mobile robot 100 may move using an elevator etc.

Example of Wagon and Its Holding

Next, details of the wagon 500 and an example of how the mobile robot 100 holds the wagon 500 will be described with reference to FIGS. 3 and 1. FIG. 3 is a perspective view showing an example of the overall configuration of the wagon 500 to be transported by the mobile robot 100. FIG. 1 shows a perspective view of the mobile robot 100 transporting the wagon 500.

The wagon 500 includes a storage portion configured to store an article, and a support portion supporting the storage portion with a space under the storage portion to allow insertion of at least part of the platform 110. As shown in FIG. 3, the storage portion can include side plates 504 on both sides of the wagon 500 and a cover 501 that can be opened and closed. The user can load and unload an article into and from the wagon 500 by opening the cover 501. As shown in FIG. 3, the support portion can include a support frame 505 supporting the storage portion, and wheels 502 attached to the lower side of the support frame 505. The wheels 502 may be provided with covers (not shown).

The wagon 500 can be held by the lifting mechanism 140 of the mobile robot 100 as described above. The lifting mechanism 140 is a mechanism for loading and unloading the wagon 500 as a transport object onto and from the upper surface side of at least part of the platform 110. Since the mobile robot 100 includes the lifting mechanism 140, the mobile robot 100 can easily automatically transport the wagon 500.

As shown in FIG. 1, the mobile robot 100 can hold the wagon 500 by the lifting mechanism 140. The space to allow insertion of at least part of the platform 110 is a space S under the wagon 500 shown in FIG. 3. This space S is a space into which the platform 110 is to be inserted.

That is, the platform 110 can enter the space S directly under the wagon 500. When loading the wagon 500 onto the platform 110, the mobile robot 100 moves in the –X direction and enters directly under the wagon 500. The platform 110 enters directly under the wagon 500 from the side in the front-rear direction on which the stand 120 is not installed. The wagon 500 can thus be loaded without the stand 120 interfering with the wagon 500. In other words, the stand 120 can be attached near the corner of the platform 110 so as not to interfere with the wagon 500.

The loading surface of the lifting mechanism 140 can have recesses 141 as shown in FIG. 2. The wagon 500 can have protrusions (not shown) on the lower side of the storage portion. The wagon 500 can be fixed to the mobile robot 100 by fitting the protrusions into the recesses 141.

Although the wagon 500 is illustrated as a cart with the wheels 502, the form and configuration of the wagon 500 are not particularly limited. The predetermined wagon exemplified by the wagon 500 may be any wagon as long as it has a shape, size, and weight at which it is transportable by the mobile robot 100.

The operations of loading the wagon 500, transporting the wagon 500 to a transport destination, and unloading the wagon 500 by the mobile robot 100 will be described. First, regarding the loading of the wagon 500, the mobile robot 100 can be a mobile robot that is set in advance to transport the wagon 500 and moves in search of the wagon 500 or moves to a known position. For example, the wagon 500 whose position is specified by the user can be assigned to the mobile robot 100 as an object to be transported or an object to be searched for, and the mobile robot 100 can autonomously move in order to transport the wagon 500. Alternatively, the mobile robot 100 may automatically transport the wagon 500 to a transport destination when it finds the wagon 500 on the way back after finishing a task of transporting another wagon or an article. The present disclosure is not limited to these examples, and various methods can be applied to the utilization of the mobile robot 100 for transport of the wagon 500.

The mobile robot 100 moves to the position of the wagon 500, and the control computer 101 recognizes the wagon 500 based on information acquired by the camera 104 or any other sensor, and controls the lifting mechanism 140 to load the wagon 500. This control to load the wagon 500 can also be referred to as "pickup control".

In the pickup control, the platform 110 is first inserted into the space S directly under the wagon 500, and the lifting mechanism 140 is raised when the insertion is completed. The lifting stage that is the upper surface of the lifting mechanism 140 thus comes into contact with the wagon 500, so that the lifting mechanism 140 can lift the wagon 500. That is, as the lifting mechanism 140 rises, the wheels 502 are lifted off the floor surface, and the wagon 500 is loaded onto the platform 110. The mobile robot 100 is thus docked with the wagon 500 and becomes ready to head to the transport destination. The control computer 101 then controls driving of the wheels 111 etc. so that the mobile robot 100 moves autonomously along a set route. The mobile robot 100 thus transports the wagon 500 to the transport destination.

The mobile robot 100 moves to the transport destination of the wagon 500, and the control computer 101 controls the lifting mechanism 140 to unload the wagon 500. In this control, the lifting mechanism 140 is lowered to unload the wagon 500 from the platform 110. The wheels 502 come into contact with the floor surface, and the upper surface of the lifting mechanism 140 is separated from the wagon 500. The wagon 500 is thus placed on the floor surface. The wagon 500 can be unloaded from the platform 110 in this manner.

The above various examples are given on the assumption that the mobile robot 100 transports a wagon such as the wagon 500 as a transport object. Even in the case where the mobile robot 100 is configured to transport a wagon, however, the mobile robot 100 may be utilized to transport an individual article (load) as a transport object. Alternatively, the mobile robot 100 may be configured to transport only an individual article. In any configuration, a storage box or shelf that keeps the article from falling while the mobile robot 100 is moving is preferably attached to the mobile robot 100.

There may be situations where the mobile robot 100 is utilized to transport a plurality of articles and it is necessary to transport the articles to a plurality of transport destinations. In this case, the user can unload the articles at the transport destinations regardless of whether the wagon 500 is used for transport. The mobile robot 100 can transport a wagon or an individual article(s) by autonomously moving to a set destination or by moving to a set destination according to user operations.

Overview of Process in Control System

When the mobile robot 100 is unable to communicate with the host management device 2, the control system according to the present embodiment determines the state of the mobile robot 100, including whether the mobile robot 100 has an abnormality, based on information acquired by sensors around the mobile robot 100.

An example will first be given below in which the sensors include the environment camera 5, the mobile robot 100 controls the first light-emitting unit 11 and the second light-emitting unit 12 to emit light, and the state of the mobile robot 100 is determined based on the light emission patterns. Examples of the other sensors and examples of the determination will be described later. It can be said that the light emission process in the mobile robot 100 is beneficial because the surrounding people or mobile robots can be notified about the state of the mobile robot 100 even in a case where the mobile robot 100 is not unable to communicate with the host management device 2 or in a configuration example in which the light emission process is not used for the determination described above.

Light Emission Process in Mobile Robot

Figure 4:
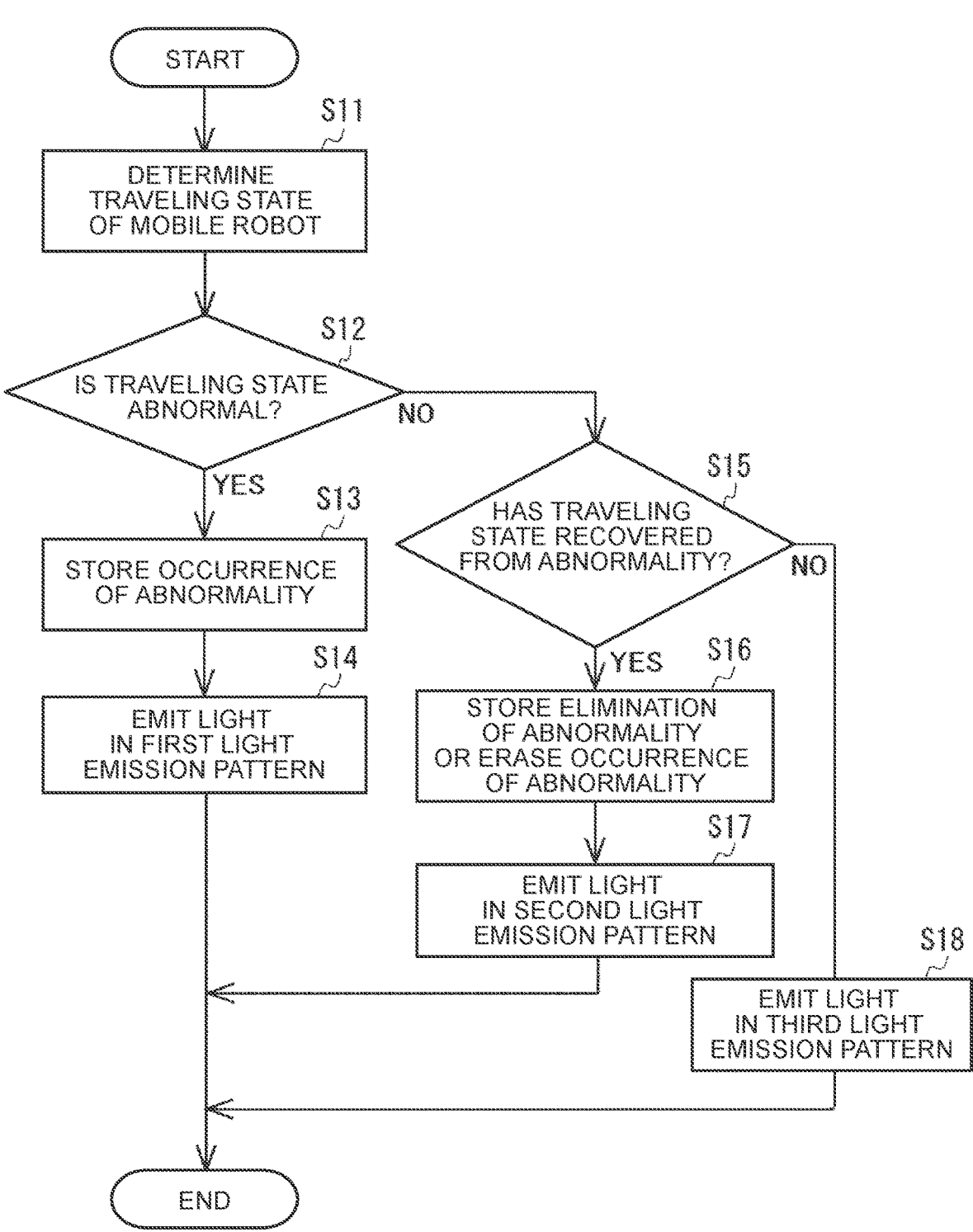
FIG. 4 is a flowchart illustrating an example of a light emission process that is performed by the mobile robot of FIG. 2.

An example of the light emission process in the mobile robot 100 will be described with reference to FIGS. 4 and 5. FIG. 4 is a flowchart illustrating an example of the light emission process that is performed by the mobile robot 100 shown in FIGS. 1 and 2. FIG. 5 shows an example of light emission patterns that can be implemented by the mobile robot 100.

As described above, the mobile robot 100 can include light-emitting units exemplified by the first light-emitting unit 11 and the second light-emitting unit 12. An example in which the mobile robot 100 includes light-emitting units at two positions will be described below. However, the mobile robot 100 may include a light-emitting unit at one position or may include light-emitting units at three or more positions, and the position, shape, and size of each light-emitting unit are not limited to the illustrated example. From the viewpoint of visibility from the surroundings, the light-emitting units are preferably mounted at a plurality of positions away from each other, as exemplified by the first light-emitting unit 11 and the second light-emitting unit 12.

The control computer 101 determines the traveling state of the mobile robot 100 associated with the traveling environment of the mobile robot 100, and controls the light-emitting units such as the first light-emitting unit 11 and the second light-emitting unit 12 to emit light in different light emission patterns depending on whether the determination result indicates that there is an abnormality or there is no abnormality. The traveling state can refer to whether an abnormality associated with the traveling environment of the mobile robot 100, such as contact with a wall, has occurred. Since the abnormality herein is based on the above determination of the traveling state, the abnormality can be referred to as "traveling abnormality". The light emission patterns can also be referred to as "light emission forms".

The determination of the traveling state can be made by the control computer 101 performing information processing, image processing, etc. based on the detection results from the sensors such as the sensor 105. The following description is given on the assumption that the determination is made in this manner. The sensors may have a function to make such a detection that the result of the detection indicates the determination result itself of the traveling state, or to determine the traveling state by performing information processing, image processing, etc. based on the sensing result. In that case, the sensors send their determination results to the control computer 101, and the control computer 101 can use the information received from the sensors as the determination result of the traveling state. The determination of the traveling state may be made by a determination unit provided separately from the control computer 101 that performs the light emission control. The determination unit can be implemented by, for example, integrated circuitry, and can be implemented by, for example, a processor such as an MPU or a CPU, a working memory, and a nonvolatile storage device.

The control computer 101 may control the first light-emitting unit 11 and the second light-emitting unit 12 to emit light in a first predetermined light emission pattern when the determination result indicates that there is an abnormality, and may control the first light-emitting unit 11 and the second light-emitting unit 12 to emit light in a second predetermined light emission pattern when the determination result indicates that the abnormality has been eliminated. The first predetermined light emission pattern and the second predetermined light emission pattern may be any patterns as long as they are different from each other. Hereinafter, the first predetermined light emission pattern and the second predetermined light emission pattern will be referred to as "first light emission pattern" and "second light emission pattern", respectively.

For such control, the control computer 101 first determines the traveling state of the mobile robot 100 based on the detection results from sensors such as the sensor 105 (step S11). The mobile robot 100 can include in, for example, the control computer 101 a storage unit (not shown) configured to store information indicating the traveling state thus determined. The control computer 101 may determine the traveling state based on information indicating the most recently stored traveling state.

After step S11, the control computer 101 performs different processes depending on whether the determined traveling state indicates that the mobile robot 100 has a traveling abnormality (step S12).

When the determination result is "YES" in step S12, that is, when the mobile robot 100 has a traveling abnormality, the control computer 101 stores information indicating the occurrence of the traveling abnormality in the storage unit (step S13). When the determined traveling state indicates the same traveling abnormality as in the previous determination, the date and time in this information only need to be updated. However, this update itself need not be performed. The control computer 101 then controls the first light-emitting unit 11 and the second light-emitting unit 12 to emit light in the first light emission pattern as illustrated in, for example, "abnormality present" in FIG. 5 (step S14), and the process ends. The order of steps S13, S14 does not matter.

When the determination result is "NO" in step S12, that is, when the mobile robot 100 does not have a traveling abnormality, the control computer 101 determines whether the traveling state has recovered from a traveling abnormality, based on information indicating the occurrences of traveling abnormalities and stored in the storage unit (step S15). When determination is made that the traveling state has recovered from a traveling abnormality, the control computer 101 stores information indicating that the traveling abnormality has been eliminated in the storage unit, or erases information indicating the occurrence of the previous traveling abnormality from the storage unit (step S16). The control computer 101 then controls the first light-emitting unit 11 and the second light-emitting unit 12 to emit light in the second light emission pattern different from the first light emission pattern, as illustrated in, for example, "abnormality eliminated" in FIG. 5 (step S17), and the process ends. The order of steps S16, S17 does not matter.

When determination is not made that the traveling state has recovered from a traveling abnormality, the control computer 101 controls the first light-emitting unit 11 and the second light-emitting unit 12 to emit light in a third light emission pattern different from the first light emission pattern and the second light emission pattern, as illustrated in, for example, "no abnormality present" in FIG. 5, in order to indicate that there has been no traveling abnormality (step S18), and the process ends. As described above, the first light-emitting unit 11 and the second light-emitting unit 12 may be controlled to emit light when there is no traveling abnormality. Alternatively, the first light-emitting unit 11 and the second light-emitting unit 12 may be turned off when there is no traveling abnormality. The above process can be repeated, for example, at predetermined intervals for determining the traveling state, or every time a change occurs in the detection results from the sensor 105 etc. that are used to determine the traveling state.

As shown in the examples of "no abnormality present", "abnormality present", and "abnormality eliminated" in FIG. 5, light emission in a plurality of light emission patterns associated with the traveling states, such as the first light emission pattern, the second light emission pattern, and the third light emission pattern, can be performed in the same light-emitting area. Although FIG. 5 illustrates an example in which the same light-emitting area is both the first light-emitting unit 11 and the second light-emitting unit 12, the same light-emitting area may be either the first light-emitting unit 11 or the second light-emitting unit 12. This allows the user to easily notice an abnormality and to easily notice that an abnormality has been eliminated, because the portion that usually emits light in a normal mode emits light in a different mode.

The light emission patterns to be used, such as the first light emission pattern, the second light emission pattern, and other light emission patterns that will be described later, may be stored in the form of, for example, a table in the control computer 101 so that they can be referred to during the light emission control.

The mobile robot 100 performs the light emission control according to the traveling state as described above. Accordingly, when a traveling abnormality associated with the traveling environment such as contact with a wall occurs, the mobile robot 100 can clearly notify the surroundings about the traveling abnormality state. When the traveling abnormality state is eliminated, the mobile robot 100 can also clearly notify the surroundings about the elimination of the traveling abnormality state. As used herein, the "surroundings" include not only surrounding people but also the environment camera 5 corresponding to a surveillance camera. It can be said that the environment camera 5 can also clearly capture an image of the traveling state. In this case, the host management device 2 makes determination. An example of the determination will be described later. As can be seen from the above description, the first light-emitting unit 11 and the second light-emitting unit 12 can function as indicators indicating the traveling state.

As described above, the first light-emitting unit 11 is a light-emitting unit mounted around the loading surface on which a transport object is to be loaded. That is, the light-emitting unit is mounted on the mobile robot 100 in consideration of the portion on which a transport object is to be loaded, as exemplified by the positional relationship between the first light-emitting unit 11 and the lifting stage. The mobile robot 100 is easily visible from the surroundings even when the mobile robot 100 has a transport object loaded thereon, and is even more easily visible from the surroundings when the mobile robot 100 does not have any transport object loaded thereon. It is therefore possible to clearly notify the surroundings of the mobile robot 100 about the traveling state. In the case where light is emitted from the area around the loading surface as in this example and the wagon 500 is used for transport, the wagon 500 may have a mirror lower surface to make the light emission more visible to the surroundings of the mobile robot 100.

As described above, the second light-emitting unit 12 is a light-emitting unit mounted on or around the joystick device for operating the mobile robot 100. The mobile robot 100 extends to a position high enough for the mobile robot 100 to be easily visible from the operator at the operation position and the surroundings, as illustrated particularly by the second light-emitting unit 12. The mobile robot 100 can therefore clearly notify the surroundings about its traveling state even in a direction in which the loading position is less visible depending on the transport object such as the wagon 500.

As described above, the mobile robot 100 may include the sensor 105 that detects contact of an object with the outer periphery of the mobile robot 100. In this case, the traveling state is determined as follows. The control computer 101 determines that there is a traveling abnormality in the traveling state when the sensor 105 detects that an object is in contact with the mobile robot 100. The control computer 101 determines that there is no traveling abnormality in the traveling state when the sensor 105 detects no contact of an object with the mobile robot 100.

With this configuration, the mobile robot 100 can clearly notify the surroundings that the mobile robot 100 is in contact with an object, and can also clearly notify the surroundings when the mobile robot 100 is no longer in contact with the object. The mobile robot 100 includes a sensor, such as the sensor 105, that detects contact of an object with the bumper installed on the outer periphery of the mobile robot 100. The bumper can protect the body of the mobile robot 100 and the object that has come into contact with the bumper. The abnormal state can be determined based on information not only from the sensor 105 but also from other sensors such as the camera 104 mounted on the mobile robot 100.

The control for changing the light emission pattern, such as between the first light emission pattern and the second light emission pattern, can include control for changing at least one of the brightness, hue, saturation, and lightness of light that is emitted from the light-emitting unit exemplified by the first light-emitting unit 11 and the second light-emitting unit 12. In an example in which the light-emitting units are mounted at a plurality of positions away from each other as exemplified by the first light-emitting unit 11 and the second light-emitting unit 12, the control for changing the light emission pattern can include control on the first light-emitting unit 11 and the second light-emitting unit 12 to emit light with different light emission parameters from each other. As used herein, the light emission parameter can be at least one of the following: brightness, hue, saturation, and lightness.

In the example in which the light-emitting units are mounted at a plurality of positions away from each other as exemplified by the first light-emitting unit 11 and the second light-emitting unit 12, the control for changing the light emission pattern can include changing the light emission position. In a certain light emission pattern, light emission can be controlled so that light is emitted at all the positions. In another light emission pattern, light emission can be controlled so that light is turned off at all the positions. For example, the control for changing the light emission pattern can include control for turning off one of the first light-emitting unit 11 and the second light-emitting unit 12 and controlling only the other light-emitting unit to emit light, that is, control for turning on and off the light emission.

In the example in which the light-emitting units are mounted at a plurality of positions away from each other as exemplified by the first light-emitting unit 11 and the second light-emitting unit 12, the control for changing the light emission pattern can include changing a combination of a plurality of positions where light is synchronously emitted. With such a configuration, the mobile robot 100 can more clearly notify the surroundings of the mobile robot 100 about its traveling state.

Examples of such light emission patterns will be described. In a certain light emission pattern, only the first light-emitting unit 11 is controlled to emit light. In another light emission pattern, only the second light-emitting unit 12 is controlled to emit light. In still another light emission pattern, the first light-emitting unit 11 and the second light-emitting unit 12 are synchronized to emit light. Examples of synchronizing the first light-emitting unit 11 and the second light-emitting unit 12 to emit light include the example of "no abnormality present" and the example of "abnormality eliminated" in FIG. 5. In an example in which the mobile robot 100 includes the light-emitting units at three or more positions, a light emission pattern can be selected from many light emission patterns obtained from various combinations of the three or more light-emission units.

Examples of controlling the first light-emitting unit 11 and the second light-emitting unit 12 to emit light without synchronizing them include the example of "abnormality present" in FIG. 5. In the example of "abnormality present" in FIG. 5, the first light-emitting unit 11 and the second light-emitting unit 12 are shown hatched in opposite directions, but such hatching is merely for convenience and indicates that they are different from each other only in phase. In the case where the first light-emitting unit 11 and the second light-emitting unit 12 are controlled to emit light alternately, this example can be regarded as an example in which the timing to turn on the first light-emitting unit 11 and the timing to turn off the second light-emitting unit 12 are synchronized. As described above, the control computer 101 can control, as a certain light emission pattern, light emission of the first light-emitting unit 11 and the second light-emitting unit 12 so that they emit light at alternate timings, namely so that they emit light alternately.

The control computer 101 need not necessarily control light emission so that the first light-emitting unit 11 and the second light-emitting unit 12 emit light at alternate timings. The control computer 101 may control, as a certain light emission pattern, the first light-emitting unit 11 and the second light-emitting unit 12 to emit light out of phase. Light emission can thus be presented in various rhythms to the surroundings.

At a plurality of positions where light is synchronously emitted, light may be emitted in a light emission pattern having a mutually complementary relationship. The "light emission pattern having a mutually complementary relationship" can be a pattern in which the first light-emitting unit 11 and the second light-emitting unit 12 are controlled to emit light in colors that are easily visible when seen as a combination, such as a pattern in which the first light-emitting unit 11 and the second light-emitting unit 12 are controlled to emit light in complementary colors.

By using such various light emission patterns as described above, the mobile robot 100 can even more clearly notify the surroundings of the mobile robot 100 about its traveling state. For example, when there is no abnormality in the traveling state, the control computer 101 may reduce light emission to save power. When there is an abnormality in the traveling state, the control computer 101 may make light emission stand out to allow to further notify the surroundings about the occurrence of the traveling abnormality.

The control system described above may stop the movement of the mobile robot 100 when the determination result of the traveling state indicates that there is a traveling abnormality. In other words, the control system may stop the movement of the mobile robot 100 when the determination result of the traveling state indicates that there is a traveling abnormality. Since the movement of the mobile robot 100 can be stopped when there is a traveling abnormality in the traveling state, it is possible to prevent the worse from happening, and improve the safety when the mobile robot 100 has a traveling abnormality.

This stop control can be implemented in such a manner that the mobile robot 100 stops the movement by itself whenever the mobile robot 100 has a traveling abnormality, as shown in the example in which the mobile robot 100 is stopped when an object is detected by the sensor 105.

The mobile robot 100 may move to a predetermined safety zone when the mobile robot 100 has a traveling abnormality. In the transport system 1, the safety can thus be improved when the mobile robot 100 has a traveling abnormality. There is a possibility that such movement cannot be implemented depending on the type of the traveling abnormality. Therefore, such movement can be implemented when the traveling abnormality is of a type that allows the mobile robot 100 to travel.

The stop or the movement to the safety zone can also be implemented by the host management device 2 controlling the mobile robot 100. When the host management device 2 described later is unable to wirelessly communicate with the mobile robot 100, the mobile robot 100 only needs to detect the communication inability and stop the movement by itself.

Also in a case of an operational abnormality described next, the mobile robot 100 may stop its movement or move to the safety zone by itself or under control of the host management device 2 as in the case of a traveling abnormality. The movement to the safety zone can be implemented when the operational abnormality is of a type that allows the mobile robot 100 to travel.

Figure 6:
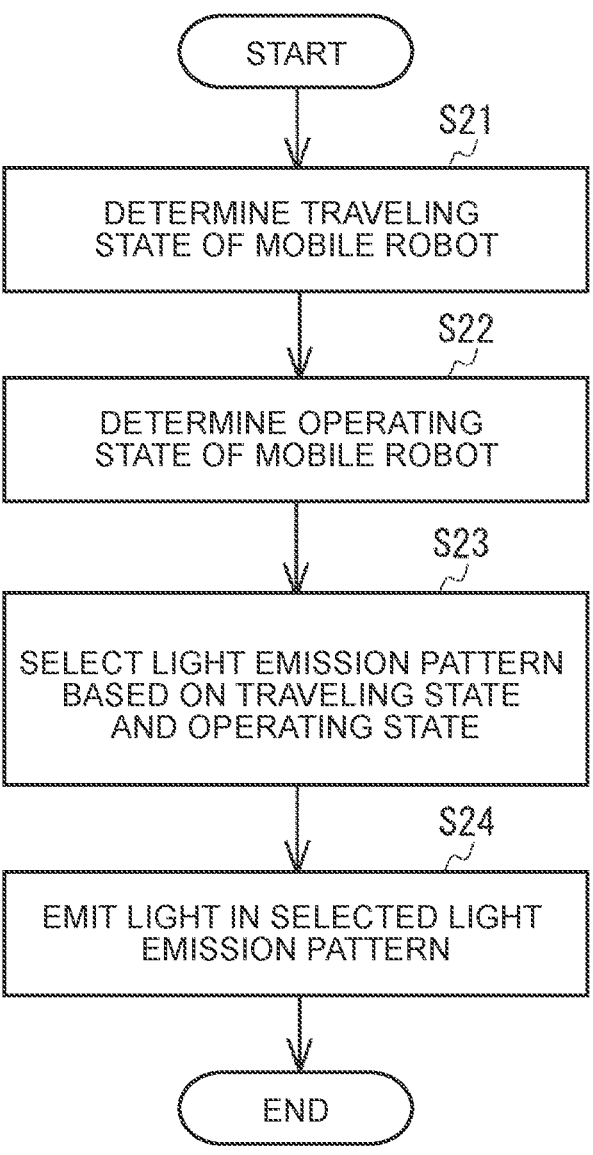
FIG. 6 is a flowchart illustrating another example of the light emission process that is performed by the mobile robot of FIG. 2.

Next, another example of the light emission process in the mobile robot 100 will be described with reference to FIGS. 6 to 8. FIG. 6 is a flowchart illustrating another example of the light emission process that is performed by the mobile robot 100 shown in FIGS. 1 and 2. FIGS. 7 and 8 show other examples of the light emission patterns that can be implemented by the mobile robot 100.

The information that is used by the control computer 101 for the light emission control can include information other than the traveling state. An example in which the information that is used by the control computer 101 for the light emission control includes the operating state of the mobile robot 100 will be described below. Information indicating the operating state can be, for example, information indicating whether the mobile robot 100 is in the autonomous movement mode, is in the user operation mode, or has some kind of operational abnormality. As used herein, the operational abnormality refers to abnormalities other than the abnormality in the traveling state associated with the traveling environment of the mobile robot 100, and refers to various abnormalities of the mobile robot 100, such as a dead battery, an abnormality in a drive unit, and an abnormality in any wheel. An example will be given below in which, when there is an operational abnormality, light emission is controlled so that light is emitted in the same light emission pattern regardless of whether the mobile robot 100 is in the autonomous movement mode or the user operation mode. However, when there is an operational abnormality, light emission may be controlled so that light is emitted in different light emission patterns depending on whether the mobile robot 100 is in the autonomous movement mode or the user operation mode.

For such control, the control computer 101 determines the traveling state of the mobile robot 100 (step S21) as in step S11 of FIG. 4, and determines the operating state of the mobile robot 100 (step S22). The order of steps S21, S22 does not matter. In step S22, in the information indicating the operating state, information indicating whether the mobile robot 100 is in the autonomous movement mode or the user operation mode can be obtained by referring to the current movement mode in the control computer 101.

Information indicating whether there is an operational abnormality can be obtained by the control computer 101 performing information processing, image processing, etc. based on the detection results from various sensors mounted on the mobile robot 100 and determining whether there is an operational abnormality. The mobile robot 100 can include in, for example, the control computer 101 a storage unit (not shown) configured to store the information indicating the operating state thus acquired. In step S22, the control computer 101 can refer to the stored information indicating the operating state.

Like the determination of the traveling state, the determination of the operating state can be made by the control computer 101 performing information processing, image processing, etc. based on the detection results from the various sensors. The following description is given on the assumption that the determination is made in this way. Each sensor may perform such detection that the result of the detection indicates the determination result itself of the operating state, or may have a function to determine the operating state by performing information processing, image processing, etc. based on its sensing result. In that case, the sensors send their determination results of the operating state to the control computer 101, and the control computer 101 can use the information received from the sensors as the determination result of the operating state. The determination of the operating state may be made by a determination unit provided separately from the control computer 101 that performs the light emission control.

After steps S21, S22, the control computer 101 selects a light emission pattern based on the determined traveling state and operating state (step S23). Although not shown in FIG. 6, the determination of the traveling state in the process of FIG. 6 can also be made in the same manner as that described for the process of FIG. 4. The control computer 101 controls the first light-emitting unit 11 and the second light-emitting unit 12 to emit light in the selected light emission pattern (step S24), and the process ends. Such a process can be repeated, for example, every time a change occurs in the detection results from the sensor 105 etc. that are used to determine the traveling state or the operating state, or at predetermined intervals.

In steps S23, S24, the control computer 101 can select a light emission pattern and perform the light emission control in, for example, the following manner. An example will be given in which the process of FIG. 6 is repeated at predetermined intervals. For example, the control computer 101 can switch the correspondence to be referred to between the correspondence between the traveling states and the light emission patterns shown in FIG. 7 and the correspondence between the operating states and the light emission patterns shown in FIG. 8, every time the process is repeated, that is, every predetermined period indicated by the predetermined interval. For example, the control computer 101 controls the first light-emitting unit 11 and the second light-emitting unit 12 to emit light in a light emission pattern indicating the traveling state in steps S23, S24, based on the correspondence between the traveling states and the light emission patterns shown in FIG. 7. After the predetermined period, the control computer 101 controls the first light-emitting unit 11 and the second light-emitting unit 12 to emit light in a light emission pattern indicating the operating state in steps S23, S24, based on the correspondence between the operating states and the light emission patterns shown in FIG. 8.

In FIG. 7, the light emission patterns defined by the colors and turn-on patterns of light emission from the first light-emitting unit 11 and the second light-emitting unit 12 are shown for each of "no abnormality present", "abnormality present", and "abnormality eliminated" as in the example of FIG. 5. The turn-on pattern is selected from an always-on pattern in which light is constantly on, a flashing pattern in which light flashes at short intervals, and a flashing pattern in which light flashes at longer intervals. However, the intervals at which light flashes, that is, the flashing intervals, can also be set in three or more stages.

In FIG. 8, the light emission patterns defined by the colors and turn-on patterns of light emission from the first light-emitting unit 11 and the second light-emitting unit 12 are shown for each of the following cases: "autonomous movement mode and normal", "user operation mode and normal", and "operational abnormality". As used herein, "normal" indicates that the operating state is normal. As can be seen from the example of the light emission patterns shown in FIG. 8, the second light-emitting unit 12 near the operation unit 130 and the stick portion 131 mainly indicates the mode when the mobile robot 100 is normal and the operational abnormality, and the first light-emitting unit 11 indicates the detailed operating state of the mobile robot 100 in the autonomous movement mode.

As the detailed operating state in the autonomous movement mode, the case of "autonomous movement mode and normal" is divided into the following four cases in FIG. 8. In other words, in FIG. 8, the light emission patterns are shown for the following four cases: "traveling autonomously" indicating that the mobile robot 100 is moving autonomously, "on standby" indicating that the mobile robot 100 is under autonomous movement control but is stopped on standby, "prompt an operation" indicating a situation where the user is prompted to perform some kind of operation, and "alert" indicating a situation where some kind of alert is given to the user or the surroundings. The case of "on standby" can refer to, for example, the case where the mobile robot 100 is being charged with a charger or is waiting for an elevator. The case of "prompt an operation" can refer to, for example, the case where the mobile robot 100 has arrived at a transport destination. The case of "alert" can refer to, for example, the case where the lifting mechanism 140 is being raised or lowered or the case where the mobile robot 100 is approaching an intersection. The case of "traveling autonomously" refers to the other cases where the mobile robot 100 is traveling autonomously.

FIG. 8 also shows an example of the turn-on patterns including a "breathing rhythm" in which the brightness of light emission is changed in a rhythm similar to the rhythm of human breathing, and "sequential lighting" in which the light-emitting portions are turned on in a sequence. Examples of the sequential lighting include controlling the first light-emitting unit 11 to sequentially turn on its light-emitting portions around the lifting mechanism 140 and controlling the second light-emitting unit 12 to sequentially turn on its light-emitting portions around the stick portion 131.

As another example of the light emission control, light may be emitted in the light emission pattern shown in FIG. 7 in half of the area illustrated as the first light-emitting unit 11 and half of the area illustrated as the second light-emitting unit 12. In that case, light can be emitted in the light emission pattern shown in FIG. 8 in the other half of the area illustrated as the first light-emitting unit 11 and the other half of the area illustrated as the second light-emitting unit 12. Although an example is given in which each of the light-emitting areas of the first light-emitting unit 11 and the second light-emitting unit 12 is divided in half, the ratio of the divided light-emitting area is not limited to this, and the ratio of the divided light-emitting area may be different between the first light-emitting unit 11 and the second light-emitting unit 12.

As still another example of the light emission control, the first light-emitting unit 11 may be controlled to emit light in a light emission pattern according to the traveling state as shown in FIG. 7, and the second light-emitting unit 12 may be controlled to emit light in a light emission pattern according to the operating state as shown in FIG. 8. Alternatively, the first light-emitting unit 11 may be controlled to emit light in a light emission pattern according to the operating state as shown in FIG. 8, and the second light-emitting unit 12 may be controlled to emit light in a light emission pattern according to the traveling state as shown in FIG. 7.

Regarding the still another example of the light emission control, the control computer 101 may be configured to switch the light emission mode between a plurality of modes such as the mode in which light is emitted in the light emission patterns shown in FIG. 7 and the mode in which light is emitted in the light emission patterns shown in FIG. 8. In the mode in which light is emitted in the light emission patterns shown in FIG. 7, the light emission control is performed according to the traveling state. In the mode in which light is emitted in the light emission patterns shown in FIG. 8, the light emission control is performed according to the operating state. As yet another example of the light emission control, the light emission patterns shown in FIG. 7 may be used for the light emission control on the first light-emitting unit 11 and the second light-emitting unit 12, and the light emission patterns shown in FIG. 8 may be used for the light emission control on two other light-emitting units provided at positions other than those of the first light-emitting unit 11 and the second light-emitting unit 12.

The examples of the colors and turn-on patterns shown in FIGS. 7 and 8 are applicable to such processing examples as described with reference to FIGS. 4 and 5.

Specific Example of Process in Control System

As described above, when the mobile robot 100 is unable to communicate with the host management device 2, the control system according to the present embodiment determines the state of the mobile robot 100 based on information acquired by sensors around the mobile robot 100. An example is given in which the environment camera 5 is provided as the sensor.

Figure 9:
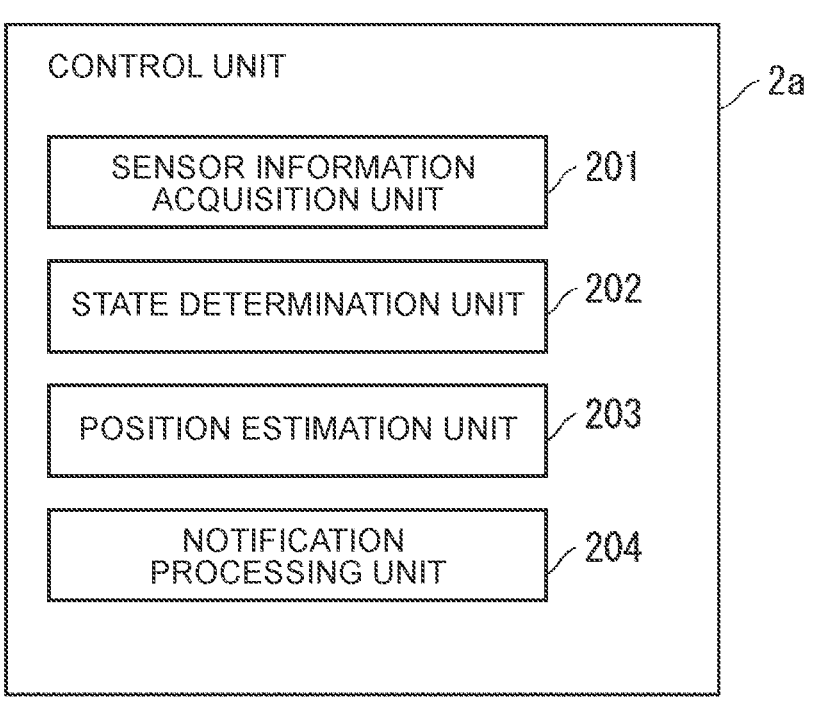
FIG. 9 is a block diagram showing an example of the configuration of a control unit of a host management device in the transport system of FIG. 1.

An example of a configuration for performing such a determination process and a process that can be added thereto will be described with reference to FIG. 9. FIG. 9 is a block diagram showing an example of the configuration of the control unit 2a of the host management device 2.

As shown in FIG. 9, the control unit 2a can include a sensor information acquisition unit 201, a state determination unit 202, a position estimation unit 203, and a notification processing unit 204. The sensor information acquisition unit 201 and the state determination unit 202 will be described here, and the position estimation unit 203 and the notification processing unit 204 will be described later together with a processing example of FIG. 11.

The sensor information acquisition unit 201 acquires image data from each environment camera 5 installed inside the facility, and transfers it to the state determination unit 202. In this example, the sensor information acquisition unit 201 can be referred to as "image acquisition unit".

The state determination unit 202 analyzes the image data of each environment camera 5 received from the sensor information acquisition unit 201, and extracts an area of the light emission pattern shown by at least one of the first light-emitting unit 11 and the second light-emitting unit 12 based on the image data showing the mobile robot 100. The area of the light emission pattern may be determined in advance as an area corresponding to a predetermined position on the mobile robot 100.

Next, the state determination unit 202 checks the extracted light emission pattern against a plurality of pre-stored light emission patterns, and detects the light emission pattern in which the mobile robot 100 emits light. The method for detecting the light emission pattern is not limited to this method.

Then, the state determination unit 202 determines the state of the mobile robot 100 associated with the detected light emission pattern. Since the state determination unit 202 determines the state of the mobile robot 100 based on the image data showing the mobile robot 100, this image data is data on an image captured by the environment camera 5 around the mobile robot 100.

The state of the mobile robot 100 includes a state indicating whether there is an abnormality, and the abnormality to be determined can include at least one of a traveling abnormality, an operational abnormality, and a mode state as described above. The mode state refers to a state indicating whether the mobile robot 100 is in the autonomous movement mode or the user operation mode. The state determination unit 202 can perform such determination, for example, by storing a table showing the correspondences illustrated in FIGS. 5, 7, and 8 and referring to the table at the time of determination.

Both the image data acquisition process and the state determination process or the state determination process can be performed at least when the host management device 2 is unable to communicate with the mobile robot 100. That is, when the communication unit 2b determines that the host management device 2 is unable to communicate with the mobile robot 100, the control unit 2a of the host management device 2 can perform, based on the image showing the mobile robot 100 and captured by the environment camera 5 around the mobile robot 100, the determination process for determining the traveling state of the mobile robot 100 from the light emission pattern shown in the image.

With such a configuration in the transport system 1, when the autonomously movable mobile robot 100 falls into an abnormal state and is unable to communicate with the host management device 2 that controls the mobile robot 100, the host management device 2 can detect the state of the mobile robot 100, including whether the mobile robot 100 has an abnormality.

For example, when the host management device 2 is unable to communicate with the mobile robot 100 due to interruption of wireless communication, a notification of an abnormality and position can be made by communication with another robot. However, the host management device 2 can detect the state of the mobile robot 100 without using such communication between the robots. Therefore, there is a possibility that the communication between the mobile robots cannot be used in an environment where the wireless communication function itself cannot be used, such as an area where a device such as a router that relays wireless communication has failed or a wireless communication trouble has occurred. Even in such a case, the host management device 2 can grasp the state of the mobile robot 100.

As described above, the abnormalities to be determined may include abnormalities other than the inability in the communication between the mobile robot 100 and the host management device 2, as exemplified by the traveling abnormality and the operational abnormality other than the communication inability. Therefore, in the transport system 1, even when an abnormality other than the communication abnormality has occurred in the mobile robot 100, the host management device 2 can detect the state of the mobile robot 100, including whether the mobile robot 100 has an abnormality. There may be only one type of abnormality to be determined, and only one light emission pattern suffices in that case. By giving a notification of a light emission pattern associated with the type of abnormality from the mobile robot 100, the host management device 2 can easily acquire information indicating the type of abnormality and determine the type of abnormality.

As described above, the sensors that acquire information serving as the basis for determination on the state of the mobile robot 100 can include a camera, and the acquired information can include an image captured by the camera. Therefore, in the transport system 1, the host management device 2 can acquire information using the environment camera 5 inside the facility where the mobile robot 100 is utilized.

Although an example has been given in which data on an image captured by the environment camera 5 is acquired, data on an image captured by a camera of another mobile robot in the transport system 1 may be acquired instead of or in addition to the data on an image captured by the environment camera 5 and used for the determination process.

Figure 10:
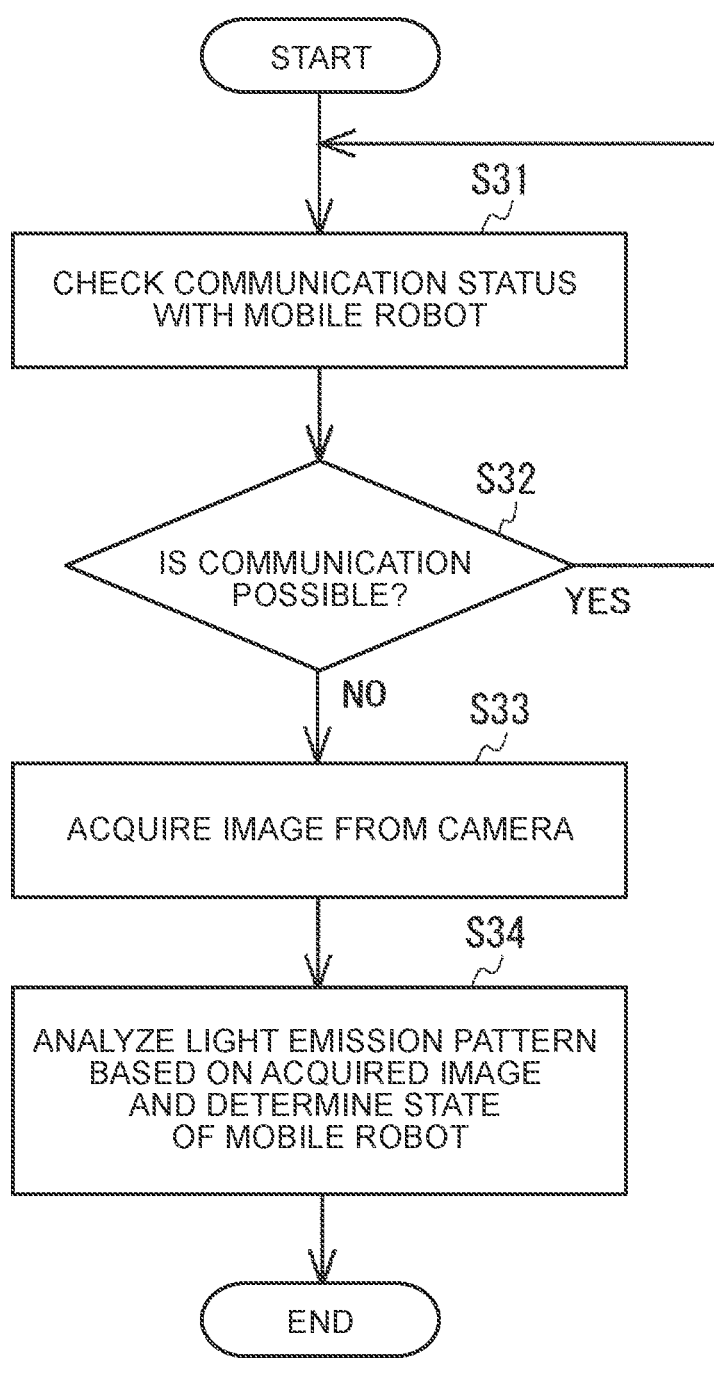
FIG. 10 is a flowchart illustrating an example of a process that is performed by the host management device in the transport system of FIG. 1.

An example of a process that is performed by the host management device 2 in the transport system 1 will be described with reference to FIG. 10. FIG. 10 is a flowchart illustrating an example of the process that is performed by the host management device 2 in the transport system 1 of FIG. 1.

First, the control unit 2a of the host management device 2 monitors the communication unit 2b to check the communication status with the mobile robot 100 (step S31), and determines whether communication with the mobile robot 100 is possible (step S32). When the control unit 2a determines that communication with the mobile robot 100 is possible, the process returns to step S31, and the control unit 2a continues to monitor the communication unit 2b. When the control unit 2a determines that communication with the mobile robot 100 is not possible, the control unit 2a acquires an image from a camera (step S33). This camera can be the environment camera 5, the camera installed in another mobile robot traveling near the position where communication with the mobile robot 100 is interrupted, or both.

The control unit 2a then analyzes the light emission pattern of the mobile robot 100 based on the acquired image and determines the state of the mobile robot 100 (step S34), and the process ends. The control unit 2a may be configured to obtain the state of the mobile robot 100 from the image by using a learning model obtained through machine learning, when analyzing the light emission pattern and determining the traveling state.

As described above, even when communication between the mobile robot 100 and the host management device 2 is not possible, the host management device 2 of the control system of the transport system 1 can detect, through the determination, the state of the mobile robot 100 presented by the light emission pattern of the mobile robot 100.

Examples of Display Device Other than Light-Emitting Units

In the above description, an example has been given in which, when the mobile robot 100 has an abnormality, the first light-emitting unit 11 and the second light-emitting unit 12 mounted on the mobile robot 100 are controlled to display a light emission pattern associated with the abnormality. The first light-emitting unit 11 and the second light-emitting unit 12 can be regarded as one type of display device that displays a display pattern associated with an abnormality by displaying a light emission pattern.

Therefore, the same idea can be applied to other types of display device as well. Examples of such a display device include a display unit of the operation unit 130, but any type of display device may be used as long as the display device is provided in the mobile robot 100 and can give a notification by displaying a display pattern associated with an abnormality. In the transport system 1, the environment camera 5, the camera installed in another mobile robot, etc. reads this display pattern regardless of the type of display device. Therefore, the host management device 2 can easily acquire the information associated with the abnormality.

As exemplified by the platform 110 in which the first light-emitting unit 11 is mounted around the lifting mechanism 140, the mobile robot 100 can include a loading unit that loads a transport object and includes at least part of the display area of a display pattern on the display device. In the case where the mobile robot 100 has such a configuration, the mobile robot 100 may perform control for unloading the transport object such as the wagon 500 when an abnormality has occurred.

The mobile robot 100 may include a loading unit that loads a transport object as exemplified by the platform 110, and may display, as the display pattern, a pattern that is unique to at least one of the presence or absence of the wagon 500 or any other transport object and the type of a loaded article. Therefore, even when communication with the mobile robot 100 is not possible, the host management device 2 can acquire information on whether the mobile robot 100 is transporting a transport object or information on an article being transported. Thus, the content and destination of notification to external terminal equipment can be varied, for example, depending on whether the article being transported needs to be transported in haste or depending on the type of the article.

The mobile robot 100 can also give a notification in a pattern unique to the mobile robot 100 as the display pattern. Thus, even when communication with the mobile robot 100 is not possible, the host management device 2 can identify the mobile robot 100 from the display pattern.

Examples of Information Acquisition Using Sensors Other than Environment Camera

The sensors around the mobile robot 100 are not limited to the example including the camera such as the environment camera 5. It is only necessary that the sensor information acquisition unit 201 can acquire information from the sensors around the mobile robot 100 and the state determination unit 202 can perform the determination process based on the information.

Regardless of whether the sensors include the camera, the sensors may include at least one of the following: a sensor mounted on another mobile robot and a plurality of sensors installed inside the facility where the mobile robot 100 moves. With such a configuration in the transport system 1, the host management device 2 can easily acquire information from the sensors.

Examples of Abnormality Notification Other than Display Pattern Notification Process by Mobile Robot In the above description, an example has been given in which the sensors around the mobile robot 100 include the cameras such as the environment camera 5 and the cameras mounted on other mobile robots and the mobile robot 100 controls the display device such as the first light-emitting unit 11 and the second light-emitting unit 12 or the display unit of the operation unit 130 to give a notification of a display pattern indicating the state of the mobile robot 100. However, the abnormality notification method is not limited to this method.

For example, when an abnormality has occurred, the mobile robot 100 may move in a movement pattern associated with the abnormality. Since the movement pattern is easily detected by a camera, the host management device 2 in the transport system 1 can easily acquire information associated with the abnormality.

The mobile robot 100 may move in a pattern unique to the mobile robot 100 as the movement pattern. Even in a case where a large number of mobile robots 100 are utilized inside the facility, patterns of movement along various trajectories can be adopted as the movement patterns. Therefore, all the mobile robots 100 can be moved in unique movement patterns. For example, the mobile robot 100 can move in a meandering movement pattern with a turning radius unique to the mobile robot 100. As a simpler example, movement patterns in which odd-numbered robots rotate clockwise and even-numbered robots rotate counterclockwise can also be adopted. The mobile robot 100 may move in a movement pattern in which it temporarily stops and turns at regular intervals while moving toward a destination, and the turning radius may be a radius unique to the mobile robot 100.

The mobile robot 100 may include a loading unit that loads a transport object as exemplified by the platform 110, and may move in a pattern that is unique to at least one of the presence or absence of the wagon 500 or any other transport object and the type of a loaded article as the movement pattern. Therefore, even when communication with the mobile robot 100 is not possible, the host management device 2 can acquire information on whether the mobile robot 100 is transporting a transport object or information on an article being transported. Thus, the content and destination of notification to external terminal equipment can be varied, for example, depending on whether the article being transported needs to be transported in haste or depending on the type of the article.

As still another example, the notification of the state of the mobile robot 100 may be given by the mobile robot 100 outputting sound using a sound output device. This sound output device can also be referred to as "speaker device" or "audio device". In order to respond to this notification, the sensor from which the sensor information acquisition unit 201 acquires information includes a microphone. That is, the sensor information acquisition unit 201 may acquire information including sound acquired by the microphone. The microphone can be mounted on the environment camera 5, or can easily be installed at various locations in the facility even if the microphone is not mounted on the environment camera 5. The microphone can be mounted on other mobile robots.

Therefore, the sensor can have a simple configuration such as the microphone. With the simple configuration, the host management device 2 can acquire information associated with an abnormality.

In particular, when the mobile robot 100 has an abnormality, the sound output device mounted on the mobile robot 100 may output sound in a pattern associated with the abnormality. Therefore, the host management device 2 in the transport system 1 can easily acquire information associated with the abnormality by simply outputting sound from the mobile robot 100. The sound output device may be a device that outputs a sentence reading voice as the sound. With this configuration, people around the mobile robot 100 can be notified about an abnormality. When a staff member of the facility is present in the people, the staff member can deal with the abnormality.

The mobile robot 100 may output sound in a pattern unique to the mobile robot 100 as the sound pattern. Even in a case where a large number of mobile robots 100 are utilized inside the facility, various patterns can be adopted as the sound patterns. Therefore, all the mobile robots 100 can output sound in unique patterns.

The mobile robot 100 may include a loading unit that loads a transport object as exemplified by the platform 110, and may output sound in a pattern that is unique to at least one of the presence or absence of the wagon 500 or any other transport object and the type of a loaded article as the sound pattern. Therefore, even when communication with the mobile robot 100 is not possible, the host management device 2 can acquire information on whether the mobile robot 100 is transporting a transport object or information on an article being transported. Thus, the content and destination of notification to external terminal equipment can be varied, for example, depending on whether the article being transported needs to be transported in haste or depending on the type of the article.

An ultrasonic output device that outputs ultrasonic waves or a device that outputs a Morse code may be adopted instead of the sound output device. In the case where the ultrasonic output device is adopted, an ultrasonic sensor can be adopted as the sensor. In the case where the device that outputs a Morse code is adopted and the Morse code is an audible signal, a microphone can be adopted as the sensor. In the case where the Morse code is an ultrasonic signal, an ultrasonic sensor can be adopted as the sensor. In the case where the Morse code is a radio signal, a radio receiving device can be adopted as the sensor. In the case where the Morse code is an optical signal, an optical sensor can be adopted as the sensor. The notification using a radio wave or light is not limited to the notification using the Morse code.

In any example, the notification can be given in a pattern associated with the type of abnormality or in a pattern associated with the type of abnormality and unique to the mobile robot 100, and the host management device 2 can determine the state of the mobile robot 100 etc. based on the information.

In particular, the notification of the state of the mobile robot 100 is given using an ultrasonic wave, a radio wave, or light as a signal (especially light invisible to humans). Therefore, the host management device 2 can determine the state of the mobile robot 100 by receiving information without the surrounding people recognizing unnecessary information.

Process for Estimating Position of Mobile Robot

The position estimation unit 203 performs a position estimation process for estimating a current position of the mobile robot 100 based on the position of a sensor from which information is acquired. When the sensors include the environment camera 5, the position of the sensor refers to the position of the environment camera 5 that has captured an image of a display pattern. Thus, the host management device 2 in the transport system 1 can easily grasp the current position of the abnormal mobile robot 100.

The notification processing unit 204 may notify external terminal equipment about the current position estimated by the position estimation process via the communication unit 2b. The external terminal equipment can refer to, for example, the user equipment 300 or other terminal equipment.

Thus, the transport system 1 can notify the outside about the current position of the abnormal mobile robot 100. Therefore, a user carrying the external terminal equipment that has received the notification can deal with the abnormality of the mobile robot 100. When the mobile robot 100 that is unable to communicate has an abnormality, the abnormality can be dealt with as follows. For example, the user can be instructed to manually move the mobile robot 100 or to collect or inspect the mobile robot 100, and the user can perform the work according to the instruction. Even when the mobile robot 100 has an abnormality and is not unable to communicate with the host management device 2, the user can similarly deal with the abnormality of the mobile robot 100 by giving such a notification.

Figure 11:
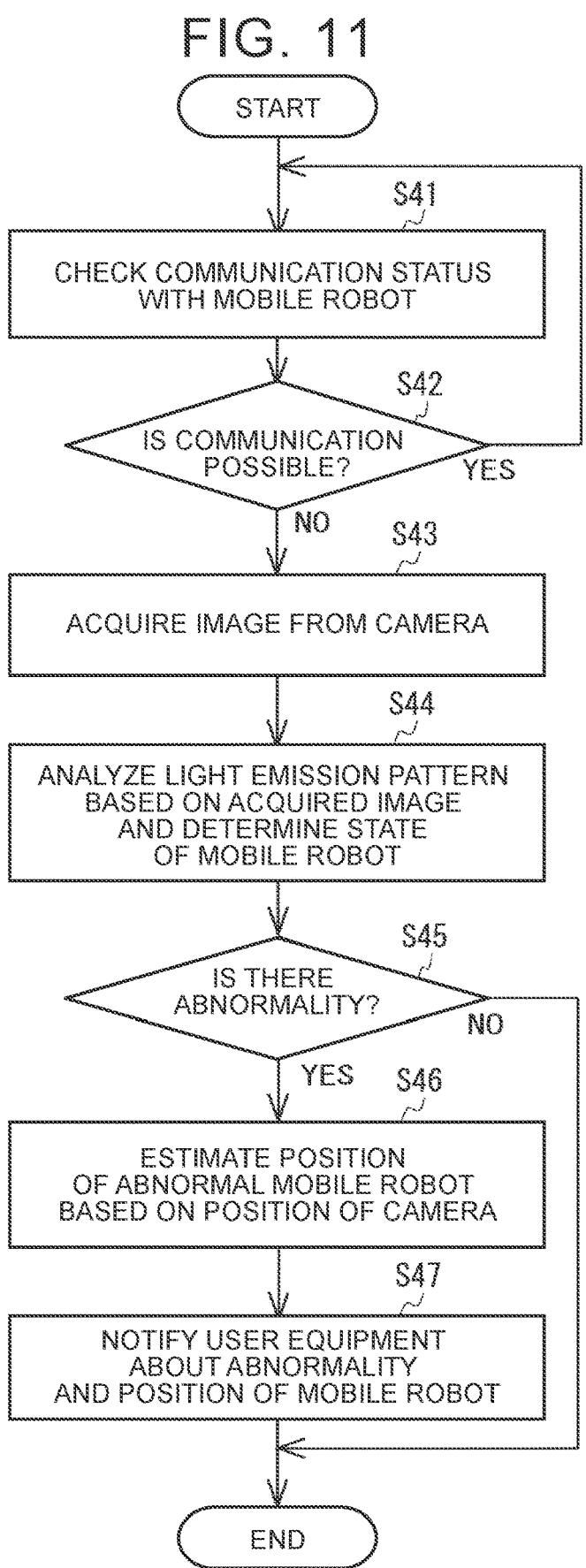
FIG. 11 is a flowchart illustrating another example of the process that is performed by the host management device in the transport system of FIG. 1.
Figure 12:
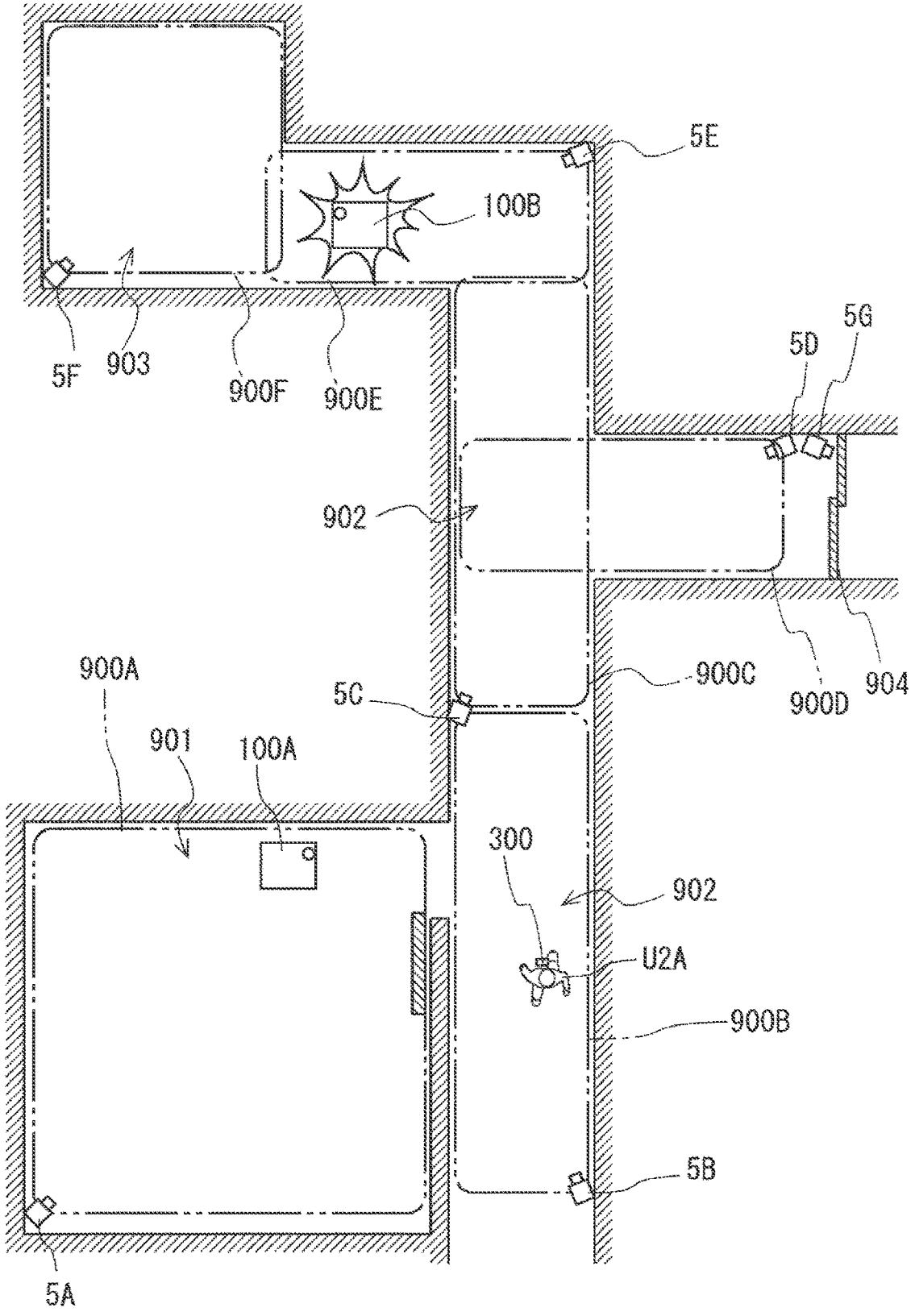
FIG. 12 is a schematic diagram illustrating an example of the process of FIG. 11.

An example of the position estimation process and the notification process will be described with reference to FIGS. 11 and 12. FIG. 11 is a flowchart illustrating another example of the process that is performed by the host management device 2 in the transport system 1 of FIG. 1. FIG. 12 is a schematic diagram illustrating an example of the process of FIG. 11, and shows a specific example of a floor of the facility where the mobile robot 100 travels and the position of the mobile robot 100. FIG. 12 is a schematic top view of the floor where the mobile robot 100 moves.

As shown in FIG. 12, the facility includes a room 901, a room 903, and a passage 902. The passage 902 connects the room 901 and the room 903. In FIG. 12, seven environment cameras 5 are installed and distinguished as "environment cameras 5A to 5G" in the description. The environment cameras 5A to 5G are installed at different positions and in different directions. The environment cameras 5A to 5G capture images of different areas. The environment camera 5G is installed at a position where it can monitor the entry and exit of a person at an entrance 904 functioning as a security gate. The positions, imaging directions, imaging ranges, etc. of the environment cameras 5A to 5G may be prestored in a storage unit (not shown) so that the control unit 2a can refer to them.

The areas allocated to the environment cameras 5A to 5F are defined as monitoring areas 900A to 900F, respectively. For example, the environment camera 5A captures an image of the monitoring area 900A, and the environment camera 5B captures an image of the monitoring area 900B. Similarly, the environment cameras 5C, 5D, 5E, 5F capture images of the monitoring areas 900C, 900D, 900E, 900F, respectively. The environment camera 5G captures an image of the range of the entrance 904. In this way, the plurality of environment cameras 5A to 5G is installed in the target facility. The facility is divided into the plurality of monitoring areas. Information on the monitoring areas may also be prestored in the storage unit (not shown) so that the control unit 2a can refer to it.

In FIG. 12, description will be given taking an example in which two mobile robots 100A, 100B are traveling as examples of the mobile robot 100 and the mobile robot 100B has an abnormality and emits light.

The host management device 2 performs the same processes as those in steps S31 to S34 of FIG. 10 (steps S41 to S44). It is assumed that neither of the mobile robots 100A, 100B is able to communicate with the host management device 2. When the result of determination in step S44 indicates that neither of the mobile robots 100A, 100B has an abnormality (NO in step S45), the control unit 2a ends the process.

When the result of determination in step S44 indicates that any mobile robot 100 has an abnormality (YES in step S45), the control unit 2a performs the position estimation process (step S46). In the example of FIG. 12, the mobile robot 100A has no abnormality and does not emit light, while the mobile robot 100B has an abnormality and emits light.

In step S46, the position estimation unit 203 estimates the position of the mobile robot 100B based on the position of the environment camera 5E that has captured an image of the light emission pattern of the mobile robot 100B. Next, the notification processing unit 204 notifies the user equipment 300 located near the estimated position of the mobile robot 100B about the abnormality and position of the mobile robot 100B (step S47), and the process ends. A user U2A carrying the user equipment 300 can head to the estimated position of the mobile robot 100B and deal with the abnormality of the mobile robot 100B.

The host management device 2 can detect the user equipment 300 located near the estimated position of the mobile robot 100B, for example, in the following manner. First, the pieces of user equipment 300 of various users are provided with position information acquisition units, and pieces of position information acquired by the position information acquisition units are constantly transmitted to the host management device 2. Thus, the host management device 2 can detect the user equipment 300 located near the estimated position of the mobile robot 100B. The method for detecting the user equipment 300 is not limited to this method. The notification destination is not limited to the user equipment 300 located near the estimated position of the mobile robot 100B, but may be predetermined user equipment 300 etc.

The notification processing unit 204 may be configured to simply notify the external terminal equipment that the mobile robot 100 has an abnormality, without providing the current position of the mobile robot 100. Even in this case, the user can deal with the abnormality by searching for the mobile robot 100.

Alternative Example

The mobile robot 100, the environment camera 5, the user equipment 300, etc. are not limited to those having the illustrated shapes, and the devices in the transport system 1, including these devices, are not limited to those performing the illustrated control. It is sufficient as long as the function of each device can be fulfilled. The host management device 2 is not limited to the physically single device, and may be distributed in a plurality of devices. That is, the host management device 2 may include a plurality of memories and a plurality of processors.

Figure 13:
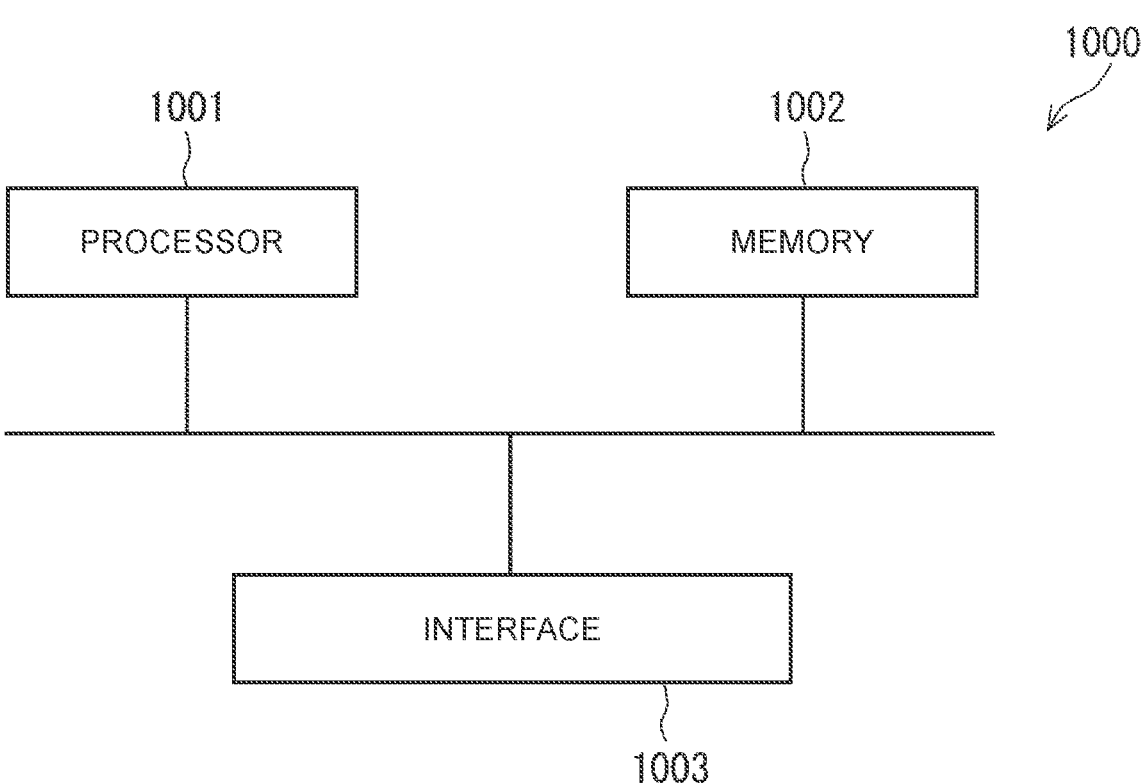
FIG. 13 shows an example of the hardware configuration of a device.

Each of the devices in the transport system 1 or the devices in the control system according to the embodiment, such as the control computer 101 of the mobile robot 100 or the host management device 2, can have, for example, the following hardware configuration. FIG. 13 shows an example of the hardware configuration of each device.

A device 1000 shown in FIG. 13 can include a processor 1001, a memory 1002, and an interface 1003. The interface 1003 can include, for example, a communication interface and an interface with a drive unit, a sensor, an input and output device, etc. as necessary for the individual device.

The processor 1001 may be, for example, an MPU, a CPU, or a graphics processing unit (GPU). The processor 1001 may include a plurality of processors. The memory 1002 is, for example, a combination of a volatile memory and a nonvolatile memory. The functions of each device are implemented by the processor 1001 loading a program stored in the memory 1002 and executing it while sending and receiving necessary information via the interface 1003.

The program includes a group of instructions (or software codes) for causing a computer to perform one or more of the functions described in the embodiment when loaded into the computer. The program may be stored in a non-transitory computer-readable medium or a tangible storage medium. Examples of the computer-readable medium or the tangible storage medium include, but are not limited to, a random-access memory (RAM), a read-only memory (ROM), a flash memory, a solid-state drive (SSD), or other memory technologies, a compact disc read-only memory (CD-ROM), a digital versatile disc (DVD), a Blu-ray (registered trademark) disc, or other optical disc storages, and a magnetic cassette, a magnetic tape, a magnetic disk storage, or other magnetic storage devices. The program may be transmitted on a transitory computer-readable medium or a communication medium. Examples of the transitory computer-readable medium or the communication medium include, but are not limited to, propagating signals in electrical, optical, acoustic, or other forms.

The present invention is not limited to the embodiment described above, and may be modified as appropriate without departing from the spirit and scope of the invention.

What is claimed is:

1. A control system configured to control a system including a mobile robot configured to move autonomously and a server configured to be connected to the mobile robot by wireless communication, the control system comprising one or more processors configured to:

when the mobile robot is unable to communicate with the server, determine a state of the mobile robot, including whether the mobile robot has an abnormality, based on information acquired by sensors around the mobile robot; and cause the mobile robot to stop traveling or move to a predetermined safety zone when the abnormality has occurred, wherein the sensors around the mobile robot include at least one of a sensor mounted on another mobile robot and a plurality of sensors installed inside a facility where the mobile robot moves, the facility including medical and welfare facilities.

2. The control system according to claim 1, wherein the sensors around the mobile robot include a camera, and information includes an image captured by the camera.

3. The control system according to claim 2, wherein the mobile robot is configured to, when the abnormality has occurred, control a display device mounted on the mobile robot to give a notification of a display pattern associated with the abnormality.

4. The control system according to claim 1, wherein the sensors around the mobile robot include a microphone, and the information includes sound acquired by the microphone.

5. The control system according to claim 4, wherein the mobile robot is configured to, when the abnormality has occurred, control a sound output device mounted on the mobile robot to output sound in a pattern associated with the abnormality.

6. The control system according to claim 1, wherein the one or more processors are configured to perform a position estimation process for estimating a current position of the mobile robot based on a position of a sensor from which the information is acquired.

7. The control system according to claim 6, wherein the one or more processors are configured to notify external terminal equipment about the current position estimated in the position estimation process.

8. The control system according to claim 1, wherein the mobile robot is configured to stop traveling when the abnormality has occurred.

9. The control system according to claim 1, wherein the mobile robot is configured to move to a predetermined safety zone when the abnormality has occurred.

10. The control system according to claim 1, wherein the abnormality includes an abnormality other than inability in communication between the mobile robot and the server.

11. A control method for controlling a system including a mobile robot configured to move autonomously and a server configured to be connected to the mobile robot by wireless communication, the control method comprising:

determining, when the mobile robot is unable to communicate with the server, a state of the mobile robot, including whether the mobile robot has an abnormality, based on information acquired by sensors around the mobile robot; and causing the mobile robot to stop traveling or move to a predetermined safety zone when the abnormality has occurred, wherein the sensors around the mobile robot include at least one of a sensor mounted on another mobile robot and a plurality of sensors installed inside a facility where the mobile robot moves, the facility including medical and welfare facilities.

12. The control method according to claim 11, wherein the sensors around the mobile robot include a camera, and the information includes an image captured by the camera.

13. The control method according to claim 12, wherein the mobile robot is configured to, when the abnormality has occurred, control a display device mounted on the mobile robot to give a notification of a display pattern associated with the abnormality.

14. The control method according to claim 11, wherein the sensors around the mobile robot include a microphone, and the information includes sound acquired by the microphone.

15. The control method according to claim 14, wherein the mobile robot is configured to, when the abnormality has occurred, control a sound output device mounted on the mobile robot to output sound in a pattern associated with the abnormality.

16. A non-transitory storage medium storing instructions that cause a computer to perform a process, the computer being included in a server configured to be connected, by wireless communication, to a mobile robot configured to move autonomously, the process comprising:

determining, when the mobile robot is unable to communicate with the server, a state of the mobile robot, including whether the mobile robot has an abnormality, based on information acquired by sensors around the mobile robot; and causing the mobile robot to stop traveling or move to a predetermined safety zone when the abnormality has occurred, wherein the sensors around the mobile robot include at least one of a sensor mounted on another mobile robot and a plurality of sensors installed inside a facility where the mobile robot moves, the facility including medical and welfare facilities.

* * * * *